United States Patent
Singh

(10) Patent No.: US 12,445,485 B2
(45) Date of Patent: Oct. 14, 2025

(54) SECURE AUTHORIZATION

(71) Applicant: Citrix Systems, Inc., Ft. Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 813 days.

(21) Appl. No.: 17/456,213

(22) Filed: Nov. 23, 2021

(65) Prior Publication Data

US 2023/0164178 A1    May 25, 2023

(51) Int. Cl.
*H04L 9/40*    (2022.01)

(52) U.S. Cl.
CPC .......... *H04L 63/1483* (2013.01); *H04L 63/08* (2013.01); *H04L 63/10* (2013.01); *H04L 63/126* (2013.01)

(58) Field of Classification Search
CPC ....... H04L 63/101; H04L 63/08; H04L 63/10; H04L 63/126; H04L 63/1483
See application file for complete search history.

(56) References Cited

U.S. PATENT DOCUMENTS

| | | | | |
|---|---|---|---|---|
| 10,855,722 | B1* | 12/2020 | Vadlamani | H04L 63/1408 |
| 11,595,437 | B1* | 2/2023 | Mushtaq | H04L 63/20 |
| 2021/0406707 | A1* | 12/2021 | Resnick | G06V 10/761 |

OTHER PUBLICATIONS

Hardt, Dick. "The OAuth 2.0 authorization framework." 76 pages (Oct. 2012).

* cited by examiner

*Primary Examiner* — Benjamin A Kaplan

(57) ABSTRACT

A computer implemented method is provided. The method includes detecting a message specifying a request to authorize an application to access a resource; reading an identifier from the message; determining whether the identifier is associated with a safe application or an unsafe application; and processing the message based on whether the identifier is associated with a safe application or an unsafe application.

22 Claims, 11 Drawing Sheets

SECURE AUTHORIZATION

BACKGROUND

Anti-phishing software attempts to identify and block phishing content prior to its presentation to a user. Phishing content can include executable and non-executable content that is designed to elicit personal information, such as security credentials, account numbers, and the like, from users for nefarious purposes. Some anti-phishing software traces links presented in content to determine whether the links lead to known phishing websites. Other anti-phishing software uses artificial intelligence and computer vision to monitor communications and user activity to identify phishing content.

SUMMARY

In at least one example, a computer implemented method is provided. The method includes detecting a message specifying a request to authorize an application to access a resource; reading an identifier from the message; determining whether the identifier is associated with a safe application or an unsafe application; and processing the message based on whether the identifier is associated with a safe application or an unsafe application.

Examples of the method can incorporate one or more of the following features.

In the method, detecting the message can include detecting a hypertext markup protocol message complying with OAuth 2.0. Detecting the message can include identifying, within the message, an address of a server configured to process the request. Identifying the address of the server can include identifying an address of an authorization server distinct from a resource server configured to control access to the resource.

In the method, determining whether the identifier is associated with a safe application or an unsafe application can include reading at least one parameter value from the request. Reading the at least one parameter value can include reading one or more of an application identifier or a redirection uniform resource identifier (URI). The method can further include comparing the at least one parameter value to at least one value stored in one or more of a safe list or an unsafe list to generate a comparison result; and determining that the identifier is associated with a safe application by matching the at least one parameter value to at least one value stored in the safe list. In the method, processing the message can include releasing the message in response to determining that the identifier is associated with the safe application. The method can further include comparing the at least one parameter value to at least one value stored in one or more of a safe list or an unsafe list to generate a comparison result; and determining that the identifier is associated with an unsafe application by matching the at least one parameter value to at least one value stored in the unsafe list. In the method, processing the message can include terminating the message in response to determining that the identifier is associated with the safe application. Terminating the message can include blocking further communication of the message. Processing the message can include communicating a denial of the request to a source of the request. Communicating the denial of the request can include communicating the denial to a browser.

The method can further include detecting a message identifying an account associated with the resource; and determining that the account is a protected account prior to determining whether the identifier is associated with a safe application or an unsafe application. In the method, detecting a message identifying an account comprises detecting a message identifying a corporate account.

In at least one example, a computer system is provided. The computer system comprises a memory and at least one processor coupled to the memory. The at least one processor is configured to detect a message specifying a request to authorize an application to access a resource; read an identifier from the message; determine whether the identifier is associated with a safe application or an unsafe application; release the message where the identifier is associated with a safe application; and terminate the message where the identifier is associated with an unsafe application.

Examples of the computer system can incorporate one or more of the following features.

In the computer system, the message can comply with OAuth 2.0. The identifier can be at least one parameter value from the request. The at least one parameter value can include one or more of an application identifier or a redirection URI.

In at least one example, a computer-implemented process is provided. The process includes receiving a message at an application programming interface (API) endpoint implemented by a software as a service (SaaS) environment; detecting that the message specifies a request to authorize an application to access a resource; reading an identifier from the message; determining whether the identifier is associated with a safe application or an unsafe application; processing the message based on whether the identifier is associated with a safe application or an unsafe application to generate a processing result; and responding to the message based on the processing result.

Examples of the process can incorporate one or more of the following features.

The API endpoint can be a first API endpoint; and receiving the message can include receiving a first message addressed to a second API endpoint within a second message addressed to the first API endpoint. In the process, receiving the message can include receiving a hypertext markup protocol message complying with OAuth 2.0.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, identical or nearly identical components that are illustrated in various figures are represented by like numerals. For purposes of clarity, not every component may be labeled in every figure.

DETAILED DESCRIPTION

Figure 1:
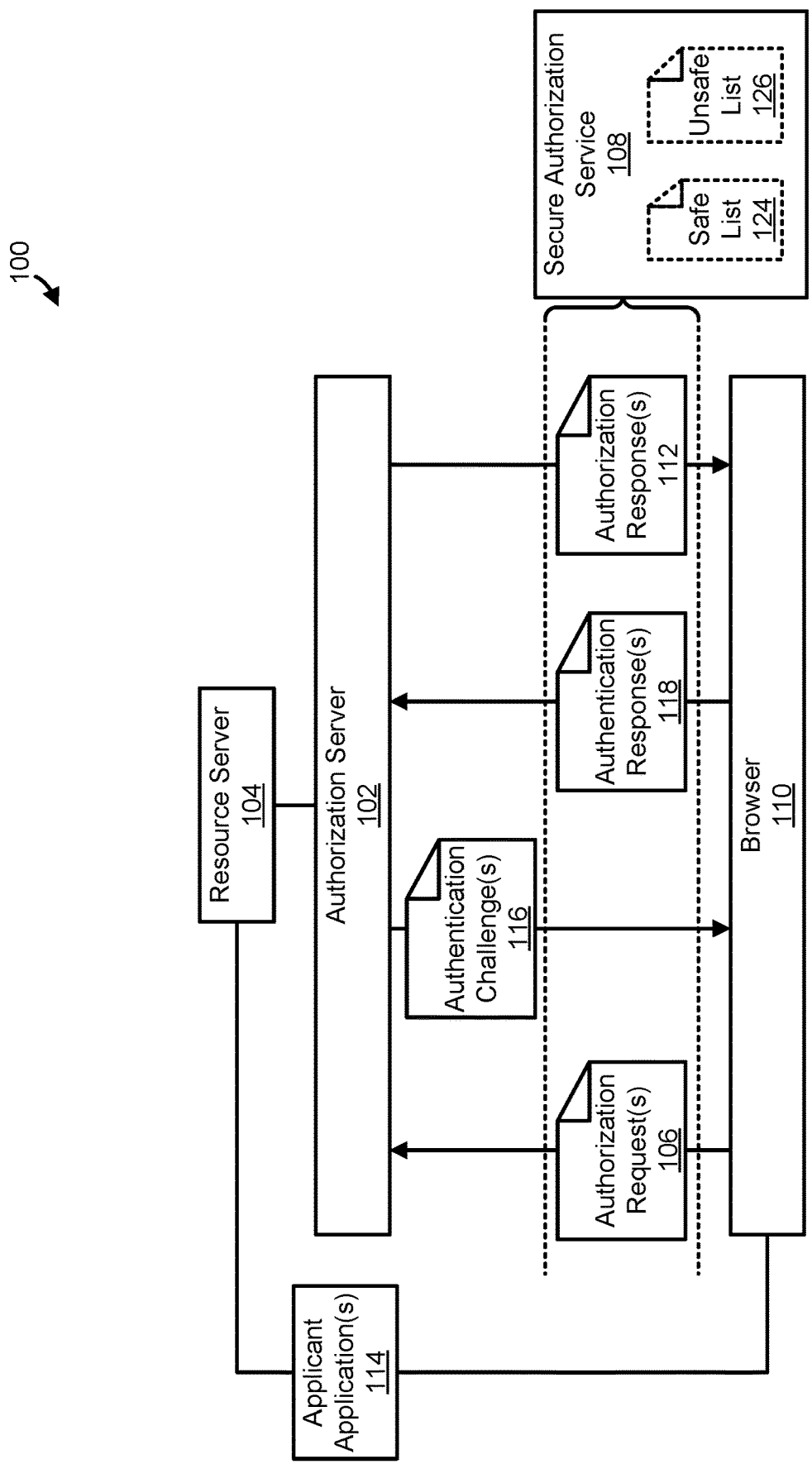
FIG. 1 is a block diagram of a secure authorization system in accordance with an example of the present disclosure.

As summarized above, at least some examples described herein are directed to systems and methods that process authorization requests in a secure manner by detecting and terminating authorization phishing attacks. Through authorization phishing, the attacker seeks to trick a victim into delegating, to a malicious program, access to digital resources (e.g., contact lists, private email content, etc.) of the victim. A common vehicle for an authorization phishing attack is to embed a link in an email, instant message, or some other form of electronic communication. When selected, the link is loaded by a browser. This browser operation initiates an authorization workflow, such as an OAuth 2.0 workflow. As part of the workflow, the user is presented with a dialog by an authentic identity provider and/or authorization server known to the victim. The dialog prompts the user to grant access to the malicious program. Once authorization is granted, the malicious program accesses and exploits the victim's resources, such as by reviewing and providing valuable information to the attacker. This valuable information can include, for example, financial information, security credentials, and contact information for friends, colleagues, and/or customers of the victim. Authorization phishing can be particularly deceptive in that the victim can, in some instances, grant authorization to resources without entering security credentials. Moreover, authorization phishing involves familiar interfaces (e.g., interfaces of an authentic identity provider/authorization server). As such, authorization phishing may seem less threatening or serious to a victim, thereby lulling the victim into a false sense of security.

Consider, for example, a social media website that supports OAuth 2.0 authorization and, through which, a small business interacts with its customer base. In this example, a handful of employees of the small business may have access to customer contact information via the social media website. A successful authorization phishing attack against any one of the employee accounts could compromise the shared customer contact information. To decrease exposure of the customer contact information, the employees can create dedicated professional accounts that are separate from any personal account held with the social media website, but maintaining these distinct accounts is inconvenient and relies on user vigilance to defeat phishing attacks launched against the professional accounts. Moreover, the social media website may provide no administrative tools to prevent phishing or the small business may not have employees trained to utilize administrative tools that are provided by the social media website. Even where the social media website provides administrative tools and the small business has employees trained to use them, the burden of doing so may be onerous, especially where such administrative tools require account specific configuration.

To address authorization phishing as described above, as well as other issues, secure authorization systems and processes are provided. These systems and processes monitor communications from and to user-facing programs (e.g., browsers) for messages that include identifiers (e.g., addresses of) authorization servers and/or programs seeking delegated authorization to access protected resources. Where such a message is detected, the secure authorization systems and processes described herein determine whether the message is, or is associated with, a legitimate authorization request or an authorization phishing message. In some examples, the secure authorization systems and processes make this determination by scanning a detected message (including message parameters) for identifiers (e.g., pre-recorded identifiers) of programs seeking delegated authorization to access to the protected resources. In some examples, only detected messages including the identifiers are allowed to proceed. In these examples, the identifiers constitute a safe list of approved delegates. In some examples, only detected messages including the identifier are terminated and thus blocked from proceeding. In these examples, the identifiers constitute an unsafe list of known malware. Where a detected message is identified as an authorization phishing message, the secure authorization systems and processes notify the user whose interaction initiated the workflow and/or execute additional protective operations.

The secure authorization systems and processes described herein can be particularly advantageous to secure digital resources shared by multiple users and accessible via multiple user accounts. This is so because the secure authorization systems and processes described herein monitor communications for identifiers of applications applying for delegated authorization to access resources. Thus, administrators of the secure authorization systems and processes described herein are not required to deal with or configure policies that are specific to user accounts—thereby greatly simplifying system configuration.

The secure authorization systems and processes described herein can be implemented within a variety of computing resources. For instance, in some examples, the secure authorization systems and processes are implemented within a browser and/or a browser extension. Moreover, in some examples, the systems and processes are implemented within a virtualization infrastructure, such as the HDX™ virtualization infrastructure commercially available from Citrix Systems of Fort Lauderdale, Florida, in the United States. In these examples, the secure authorization systems and processes can be implemented within a digital workspace application, such as the Citrix Workspace™ application; a browser embedded within the digital workspace application; a secure browser service, such as the Citrix Secure Browser™ service; a gateway appliance, such as the Citrix Application Delivery Controller™ (ADC); a virtualization agent, and/or other computing resources.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Secure Authorization System

In some examples, a secure authorization system is configured to monitor communications between clients and servers and identify authorization phishing activity. Where such phishing activity is detected, the secure authorization system executes one or more protective operations, such as transmitting notifications to other processes and/or terminating compromised communications and processes. Where phishing activity is not detected, the secure authorization system executes no protective operations, but rather allows monitored authorization communications and processes to execute normally. FIG. 1 illustrates a logical architecture of a secure authorization system 100 in accordance with these examples.

As shown in FIG. 1, the system 100 includes an authorization server 102, a resource server 104, a secure authorization service 108, a browser 110, and one or more applicant application(s) 114. An individual, generic member of the applicant application(s) 114 may be referred to herein as an applicant application 114. FIG. 1 also illustrates lines of communication between these computer-implemented processes. For example, the browser 110 transmits one or more authorization request(s) 106 to the authorization server 102, and the browser 110 receives one or more authorization response(s) 112 from the authorization server 102. Moreover, in certain examples, the authorization server 102 transmits one or more authentication challenge(s) 116 to the browser 110, and the authorization server 102 receives one or more authentication response(s) 118 from the browser 110. An individual, generic member of the authorization request(s) 106, the authorization response(s) 112, authentication challenge(s) 116, or the authentication response(s) 118 may be referred to herein respectively as an authorization request 106, an authorization response 112, an authentication challenge 116, or an authentication response 118. Additional details regarding these and other communications are provided below, but it should be noted that the depicted lines of communication can include inter-process communication (e.g., where two or more of the computer-implemented processes illustrated in FIG. 1 reside within the same execution environment) and network-based communication (e.g., where two or more of the processes reside in different execution environments coupled to one another by a computer network).

Continuing with examples illustrated by FIG. 1, the authorization server 102 and the resource server 104 are collectively configured to control access to resources protected by the resource server 104 using an authorization protocol, such as the OAuth 2.0 protocol. These protected resources can include, but are not limited to, user data representative of contacts, documents, videos, photographs, and the like. In these examples, the resource server 104 is configured to expose an application programming interface (API) that receives, processes, and transmits responses to request messages received from calling processes (e.g., the applicant application(s) 114). These request messages can include, for example, requests to access the protected resources. Such resource requests can include identifiers of the protected resource and the scope of access requested. In certain examples, the resource server 104 is configured to respond to a resource request by determining whether the resource request includes an unexpired token authorized for the requested scope of access to the protected resources. In these examples, the resource server 104 is further configured to respond to resource requests that include such a token by providing the requested scope of access to the protected resources. Conversely, in these examples, the resource server 104 is also configured to respond to resource requests that lack such a token by transmitting a resource response message that denies the calling process access to the protected resources. In some examples, this resource response indicates the basis for the denial (e.g., that the resource request lacked proper authority to access the protected resource) and/or a uniform resource identifier (URI) of an authorization server (e.g., the authorization server 102) configured to grant tokens authorizing access of the requested scope to the protected resources.

Continuing with examples illustrated by FIG. 1, the authorization server 102 is also configured to expose an API that receives, processes, and transmits responses to authorization requests (e.g., the authorization request(s) 106) from calling processes (e.g., the browser 110). These request messages can include, for example, requests to be authorized for an identified scope of access to protected resources. Such authorization requests can include an identifier of the protected resource, the scope of access requested, an identifier of an applicant application 114, and a type of authorization credential requested (e.g., a code or a token), among other parameters. The authorization server 102 is configured to respond to an authorization request by interoperating with the calling process to authenticate the user. Authentication interoperations may involve the authorization server 102 and the calling process (e.g., where the authorization server 102 includes an identity provider) or may redirect the calling process to an identity provider distinct from and trusted by the authorization server 102. In addition, authentication interoperations include communicating the authentication challenge(s) 116 and the authentication response(s) 118. The authentication challenge(s) 116 can specify prompts for the user to enter security credentials (e.g., a username that identifies an account and/or a password to access the account). The authentication response(s) 118 can include data that specifies responses to these prompts and data indicating whether the user grants authorization to an applicant application 114. In some examples, the authorization server 102 is further configured to transmit an authorization response message (e.g., an authorization response 112) to the browser 110. The authorization response 112 can redirect the browser 110 to an address specified in the authorization request. This address can include, for instance, at least a portion of a URI exposed and implemented by an applicant application 114. The authorization response message can include an authorization credential of the requested type where the user is successfully authenticated and grants authorization. Conversely, in these examples, the authorization server 102 is further configured to transmit an authorization response message that denies the authorization credential where the user is not successfully authenticated or does not grant authorization.

Continuing with examples illustrated by FIG. 1, the applicant application(s) 114 are configured to seek and utilize authorization to access a resource protected by the resource server 104. In some examples, an applicant application 114 is a legitimate application programmed to access the protected resource to provide useful functionality to the owner of the resource or a user associated therewith. For instance, in some examples, the applicant application 114 may be an email application configured to access a list of social media contacts protected by the resource server 104 so that the email application can more easily generate emails to those contacts. Thus, the email application is configured to request access (e.g., via the browser 110) to the list of social media contacts from the resource server 104 and thereby initiate an authorization process supported by the resource server 104 (e.g., an OAuth 2.0 workflow). In other examples, the applicant application 114 is malware programmed to exploit access to the protected resource to the benefit of a party other than the owner or an associated user. In any case, the applicant application(s) 114 are configured to receive and process redirected authorization response messages. Where the authorization response message includes a code, the applicant application(s) 114 use the code to request and receive a token from the authorization server 102 and use the token to request and receive access to the protected resource from the resource server 104. Where the authorization response message includes a token, the applicant application(s) 114 use the token to request and receive access to the protected resource from the resource server 104. It should be noted that, as shown in FIG. 1, the applicant application(s) 114 are also configured to serve web pages to the browser 110, although this is not a requirement. In some examples, the browser 110 is a light-weight browser embedded within an applicant application 114.

Continuing with examples illustrated by FIG. 1, the browser 110 is generally configured to provide a browser execution environment capable of rendering and/or interpreting content ranging from simple HTML pages to complex JavaScript code. In some examples, the browser 110 is more specifically configured to take part in authorization processes in which the browser 110 interacts with a user and interoperates with the authorization server 102 to request that one of the applicant application(s) 114 be granted authorization to access a resource protected by the resource server 104. In some examples, the applicant application(s) 114 and the authorization server 102 configure the browser 110 to interact with a user and interoperate with the authorization server 102 and the applicant application(s) 114 by serving a web page to the browser 110. As shown in FIG. 1, the interoperations that the browser 110 is configured to execute include communication of the authorization request(s) 106 and the authentication response(s) 118 to the authorization server. In examples directed to OAuth 2.0, the authorization request(s) 106 can include parameters such as a response type, an identifier of one of the applicant application(s) 114, a redirection URI, a scope of authorized access, and a state. Further, in these examples, the authorization response(s) 112 can individually include an authorization code and the state parameter passed in the corresponding authorization request. The contents of the authorization response 112 are defined in the RFC 6749. The authentication challenges(s) 116 and the authentication response(s) 118 can include prompts for entry of security credentials and responses thereto as well as an indication of whether the user grants authorization to an applicant application 114. It should be noted that the browser 110 can be one or more of an independent, commercially available browser; a browser embedded within another application; a virtualized browser implemented, for example, via the Citrix Secure Browser™ service; or another type of browser.

Continuing with examples illustrated by FIG. 1, the secure authorization service 108 is configured to monitor communications between the browser 110 and the authorization server 102 for one or more indication(s) of authorization phishing messages. As shown in FIG. 1, the secure authorization service 108 includes a safe list 124 and/or an unsafe list 126. The safe list 124 and/or the unsafe list can include URIs, URLs, or portions thereof—including tenant identifiers. In some examples, the secure authorization service 108 is configured to scan hypertext transfer protocol (HTTP) messages originating from or sent to the browser 110 for indication(s) of authorization phishing. These indication(s) can include the presence or absence of identifiers of applicant application(s) 114 within the authorization request(s) 106 or the authorization response(s) 112. In some examples, the secure authorization service 108 is configured to maintain a list 126 of identifiers of unsafe applicant application(s) 114 that are potentially malicious or otherwise unauthorized or not safe to use and to scan the HTTP messages for these unsafe identifiers. Alternatively or additionally, in certain examples, the secure authorization service 108 is configured to maintain a list 124 of identifiers of safe applicant application(s) 114 that are authorized or otherwise safe to use and to scan HTTP messages for applicant application identifiers other than the safe identifiers. Further still, in certain examples, the secure authorization service 108 is further configured to scan HTTP messages originating from the browser 110 for identifiers of personal and/or professional accounts and to selectively engage or disengage phishing security based on the type of account involved in an authorization workflow. Regardless of the scanning process used, the secure authorization service 108 is also configured to execute one or more protective operations in response to detecting an indication of authorization phishing. Further details of example processes that the secure authorization service 108 is configured to execute are described further below with reference to FIGS. 2A through 3B.

It should be noted that, in some examples, the resource server 104 implements an HTTP service that implements an API used to access the protected resources.

Figure 2A:
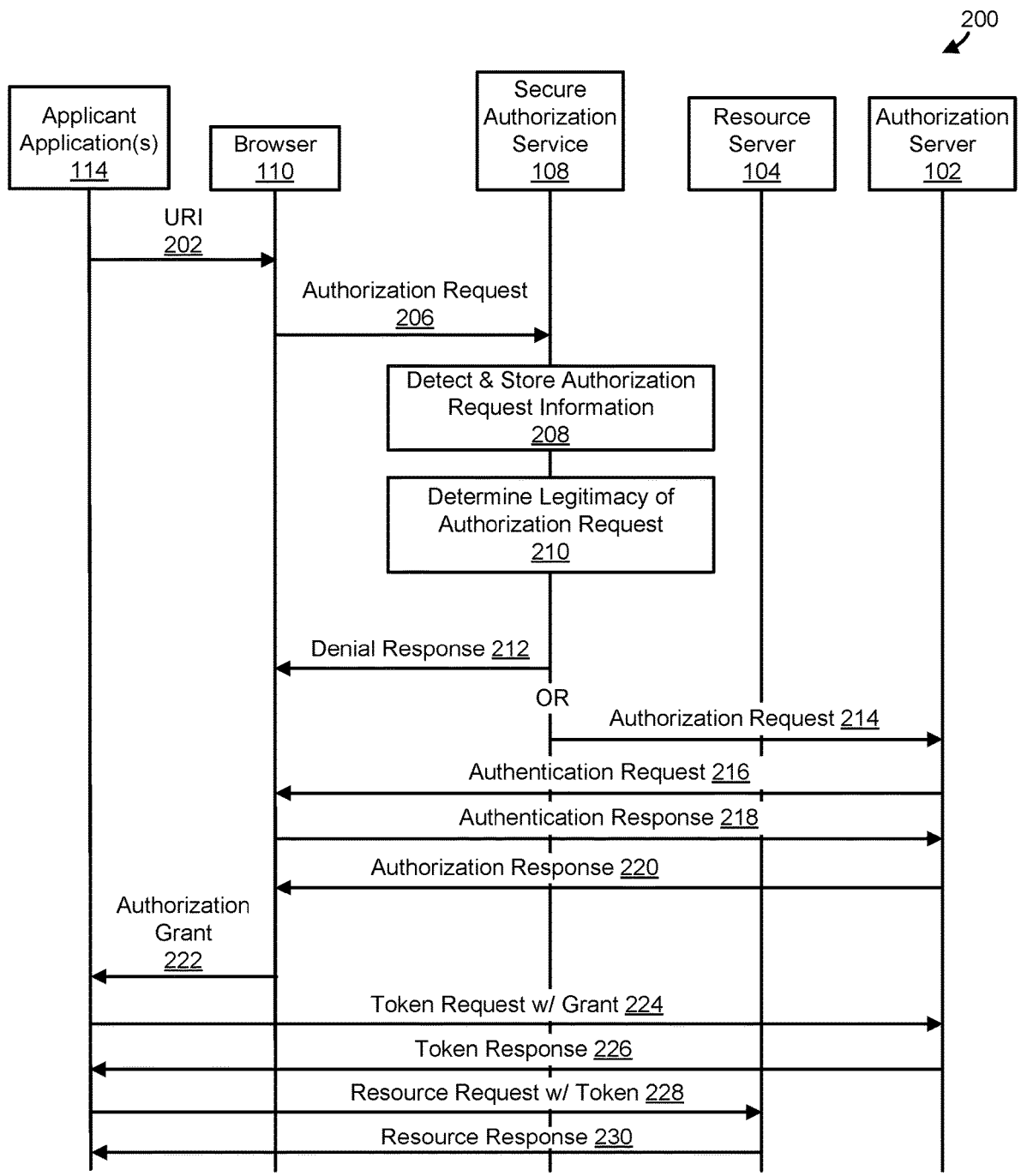
FIG. 2A is a sequence diagram illustrating interoperation of processes implemented by the secure authorization system of FIG. 1 in accordance with an example of the present disclosure.

FIG. 2A is a sequence diagram that illustrates one example of an authorization phishing protection process 200. As shown in FIG. 2A, the process 200 includes interoperations between the computer-implemented processes illustrated in FIG. 1 that collectively prevent authorization phishing, while not substantially hampering authorization of legitimate applicant applications.

The process 200 starts with an applicant application (e.g., an applicant application 114 of FIG. 1) communicating a URI 202 to a browser (e.g., the browser 110 of FIG. 1). The browser attempts to access the URI 202 and thereby generates and attempts to transmit an authorization request 206 (e.g., the authorization request 106 of FIG. 1) to an authorization server (e.g., the authorization server 102 of FIG. 1). The authorization request 206 can include, for example, an identifier of the protected resource and an identifier of the scope of access sought. In examples where the authorization server supports OAuth 2.0, the authorization request 206 can include an identifier of a type of authorization credential sought (e.g., a code or a token), an identifier of the applicant application, a URI of a callback function (e.g., the redirection URI parameter), and a state parameter.

Continuing with the process 200, a secure authorization service (e.g., the secure authorization service 108 of FIG. 1) detects and stores 208 the authorization request 206 prior to its reception by the authorization server. This detection can be accomplished using any combination of a variety of techniques including, for example, code injection via a browser helper object (BHO)/extension to the browser; registration of the browser as a URI scheme handler of authorization request URIs; scripting of a proxy server utilized by the browser; inspection of communications from the browser via a gateway appliance, or the like. In some examples, to detect authorization requests, the secure authorization service monitors messages from the browser for addresses of authorization servers. These addresses may be pre-recorded via interaction between administrative personnel and the secure authorization service. This interaction can include receiving input specifying the addresses (e.g., via direct entry of the addresses and/or via automated extraction of the addresses from authorization workflows conducted using administrative accounts). For instance, in one example, a message from the browser may include a URL comprising "https://login.microsoftonline.com/". In these examples, the secure authorization service matches (e.g., identifies equivalency between) a portion of the URL and a previously recorded URI string—"https://login.microsoftonline.com/" and, therefore, identifies the message as an authorization request. The previous recorded URI string may be a complete URI or a portion thereof.

In certain examples, where an authorization server is specific to a tenant of a multitenant cloud computing service and the authorization server is specific to the tenant, the recorded URI can include a tenant identifier to narrow the number of messages identified as authorization requests and, thereby, conserve computing resources consumed by the secure authorization service. For instance, a message from the browser may include a URL comprising https://login.microsoftonline.com/335836de-42ef-43a2-b145-348c2ee9ca5b/oauth2/v2.0. In these examples, the secure authorization service matches the URL to a previously recorded URI string that includes the tenant identifier "335836de-42ef-43a2-b145-348c2ee9ca5b" and identifies the message as an authorization request, provided that the message also identifies an authorization server. Conversely, in these examples, the secure authorization service does not identify a message as an authorization request unless the message includes at least one URI string (e.g., a pre-recorded URI string). It should be noted that examples that implement this technique can be configured to not interfere with personal use of the browser by pre-recording only URI strings that include identifiers of tenants who subscribe to the secure authorization service.

Alternatively or additionally, in some examples, to detect 208 authorization requests, the secure authorization service monitors messages from the browser for other values indicative of authorization requests. These other values can include string values that appear within authorization requests complying with particular standards. For instance, where the authorization standard is OAuth 2.0, the string values can include "oauth", "oauth2", or the like. The string values can also include identifiers of required and/or optional parameters of authorization requests complying with the particular standards. For instance, the string values indicative of authorization requests can also include, for example, "client_id", "redirect_uri", or the like. Moreover, depending on the specificity and sensitivity desired, to detect authorization requests, some examples of the secure authorization service monitor messages for string values that are arranged according to a syntax specified by particular authorization request standards. In these examples, the secure authorization service monitors messages for the string values (e.g., "oauth", "client_id", and "redirect_uri") specified in a particular order. In these examples, the secure authorization service identifies messages as authorization requests where the string values are identified according to any required syntax in the messages. Conversely, in these examples, the secure authorization service does not identify a message as an authorization request where the string values are not identified within the message or the string values within the message do not comply with a required syntax. It should be noted that these string values and syntax requirements can be pre-recorded via interaction between the secure authorization service and administrative personnel. This interaction can include receiving input specifying the values indicative of authorization requests (e.g., via direct entry of the values and/or via automated extraction of the values from authorization workflows conducted using administrative accounts). It should also be noted that these examples do not rely on a unique identifier of a resource server or authorization server to be effective. As such, these examples can secure authorization requests addressed to any resource server or authorization server, including multiple servers owned by different parties.

Consider, for example, an organization that uses an identity provider hosted by a cloud computing service to authenticate employee accounts and also uses first and second social media applications (e.g., TWITTER and FACEBOOK) for marketing purposes. In this example, an employee may access the first social media service by authorizing the first social media service to access the employee's resources within the second social media service. To protect these employees professional and personal accounts, the secure authorization service can, in the operation 206, identify authorization requests that are communicated to the second social media service without monitoring for specific addresses, as described above.

Continuing with the process 200, the secure authorization service determines 210 the legitimacy of the authorization request 206 by inspecting the authorization request 206 to determine whether an indication of authorization phishing is present therein. In some examples, the indication of authorization phishing includes the presence or absence of identifiers of certain applicant applications. For instance, in examples directed to authorization processes that utilize redirection (e.g., OAuth 2.0), the secure authorization service parses authorization requests to extract parameters and attempts to match the extracted parameters to identifiers (e.g., pre-recorded identifiers) of applicant applications and/or redirection URI's (e.g., pre-recorded redirection URI's) associated with applicant applications. For instance, in one example, the authorization request 206 may include a URL comprising "client_id=c2a75407-ba9b-4a60-b798-1259f64b4a70" and/or "redirect_uri=https://sneaky-app.com/callback". In this example, the secure authorization service parses the authorization request 206 to extract the identifier of the applicant application ("c2a75407-ba9b-4a60-b798-1259f64b4a70") and/or the redirection URI parameter ("https://sneaky-app.com/callback"). It should be noted that the redirection URI parameter can include a tenant identifier, in some examples.

Further, in examples where the secure authorization service maintains an unsafe list (e.g., the unsafe list 126 of FIG. 1) of URI strings, the secure authorization service determines whether one or more of the extracted parameters match (e.g., are equivalent to or include) one or more entries in the unsafe list. In certain examples, the secure authorization service identifies the authorization request 206 as an authorization phishing message where one or more of the extracted parameters match one or more entries in the unsafe list. Alternatively or additionally, in certain examples, the secure authorization service identifies the authorization request 206 as a legitimate authorization request where one or more of the extracted parameters do not match one or more entries in the unsafe list. In these examples, the unsafe list is assumed to be complete. Alternatively or additionally, in examples where the secure authorization service maintains a safe list (e.g., the safe list 124 of FIG. 1), the secure authorization service determines whether one or more of the extracted parameters match (e.g., are equivalent to or include) one or more entries in the safe list. In these examples, the secure authorization service identifies the authorization request 206 as an authorization phishing message where none of the extracted parameters match one or more entries in the safe list. Alternatively or additionally, in examples where the secure authorization service maintains a safe list, the secure authorization service identifies the authorization request 206 as a legitimate authorization request where one or more of the extracted parameters match one or more entries in the safe list.

Continuing with the process 200, where the secure authorization service determines that the authorization request 206 is an authorization phishing message, the authorization service responds to the authorization request with a denial response 212 and/or prevents the authorization request 206 from reaching the authorization server. The denial response 212 may include HTML that, when rendered by the browser, indicates to a user that the authorization request was a phishing attack. To prevent the authorization request 206 from reaching the authorization server, some examples of the secure authorization service terminate browser processing of the URI 202 prior to any interoperation between the browser and the authorization server. Alternatively or additionally, some examples of the secure authorization service that can affect communications between the browser and the authorization server do not forward and/or block further communication of the authorization request 206.

Continuing with the process 200, where the secure authorization service determines that the authorization request 206 is a legitimate authorization request 214, the secure authorization service transmits the legitimate authorization request 214 to the authorization server. The authorization server, in response, transmits an authentication challenge 216 (e.g., the authentication challenge 116 of FIG. 1) to the browser. The authentication challenge 216 can include identifiers of one or more authentication mechanisms that the authorization server supports and/or requires to authenticate a user as the owner of the protected resource. The authentication challenge 216 can further prompt the user to enter grant information that specifies whether the authorization request is granted or denied.

Continuing with the process 200, the browser collects authentication and grant information from the user. This authentication information can include information required to satisfy the authentication mechanisms required by the authorization server. The grant information specifies whether the user grants the applicant application authorization to access the protected resource at the requested scope. It should be noted that, in some examples, the browser can be configured to collect the authentication information prior to receiving the authentication challenge 216 from the authorization server. For example, the browser can be configured to collect authentication information upon boot of an endpoint device executing the browser, upon initiation of the browser (where that initiation is distinct from endpoint device boot), upon expiration of a timer, or in response to some other event. It should also be noted that, in some examples, the authentication information can include a credential that indicates that the user has been authenticated by a service (e.g., a domain controller) trusted by the authorization server. In these examples, the authorization server authenticates the user by processing the credential to ensure its authenticity (e.g., via private/public key encryption/decryption, etc.).

Continuing with the process 200, the browser transmits an authentication response 218 (e.g., the authentication response 118 of FIG. 1) including the authentication information and the grant information to the authorization server. The authorization server receives the authentication response 218, parses the authentication response 218 to identify and retrieve the authentication information and the grant information, and determines whether the grant information specifies an authorization grant from the user to the applicant application. Where such a grant is specified by the grant information, the authorization server attempts to authenticate the user with the authentication information. As explained above, this user authentication may involve interoperation with an identity provider other than, but trusted by, the authorization server. Next, the authorization server generates an authorization response 220 (e.g., an authorization response 112 of FIG. 1). Where the authorization server successfully authenticates the user and verifies the authorization grant, the generated authorization response 220 includes the requested authorization credential (e.g., a code). Where the authorization server fails to successfully authenticate the user or fails to verify the authorization grant, the generated authorization response 220 includes an indication that the authorization server was unable to authenticate the user or that user did not grant authorization (e.g., an error message). Next, the authorization server transmits the authorization response 220 to the browser within a redirect to the applicant application. The browser executes the redirect and, thereby, transmits the authorization credential 222 to the applicant application.

Continuing with the process 200, the applicant application receives the authorization credential 222, parses it to retrieve the code, and transmits a token request 224 with the code to the authorization server. The authorization server receives, processes, and responds to the token request 224 by generating and transmitting a token response 226, including a token granting the scope of access authorized by the authorization credential, to the applicant application. The applicant application receives the token response 226, parses it to retrieve the token, and transmits a resource request 228 with the token to a resource server (e.g., the resource server 104) that enables access to the protected resource. The resource server receives, processes, and responds to the resource request 228 by generating and transmitting a resource response 230 granting the scope of access requested in the resource request 228 and authorized by the token. Upon completion of the process 200, the applicant application can access the protected resources for subsequent processing.

It should be noted that the operations 208 and 210 can be readily adapted to detect, store, and determine the legitimacy of the authorization response 220 alternatively, or in addition to, detecting, storing, and determining the legitimacy of the authorization request 106.

Figure 2B:
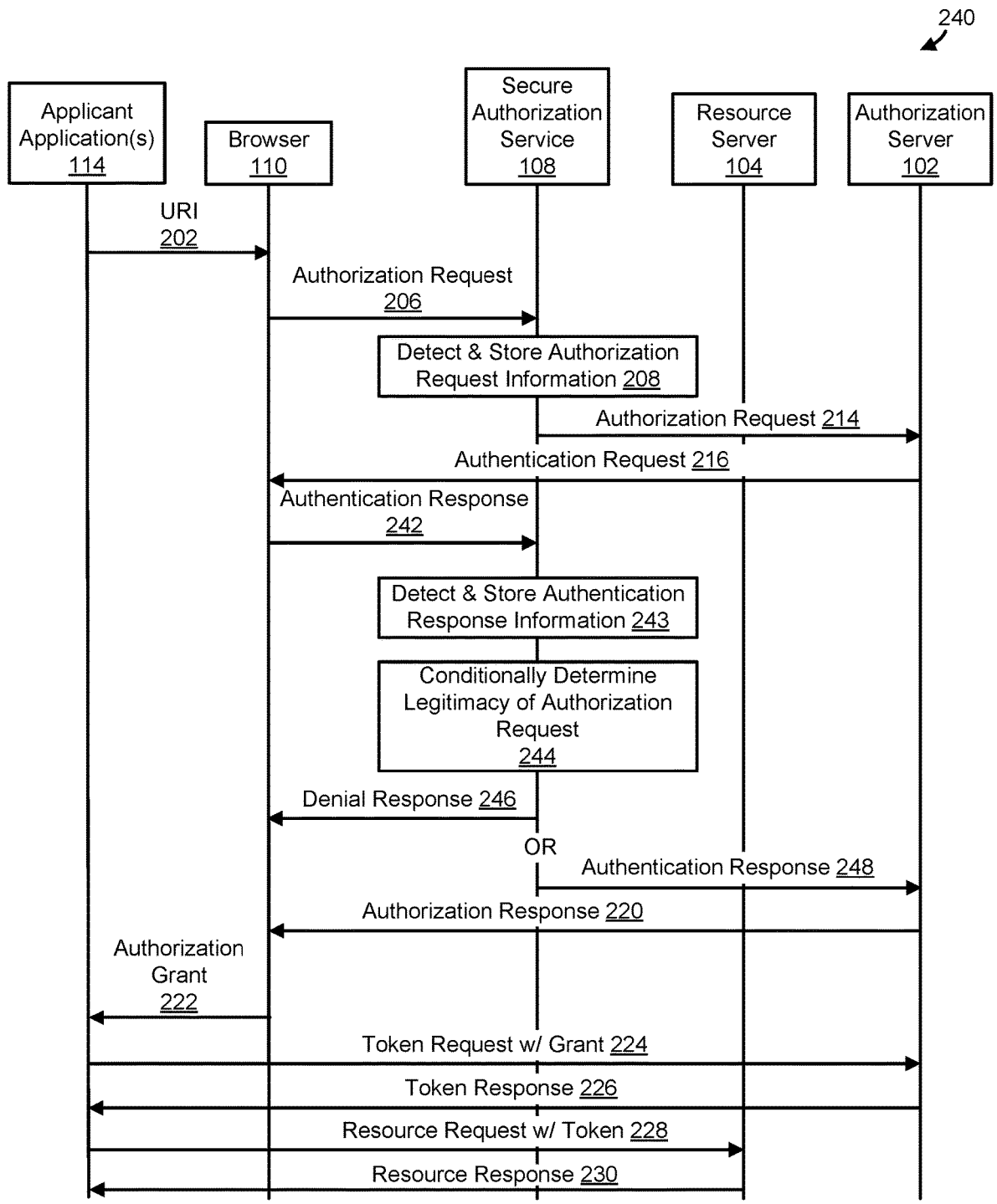
FIG. 2B is a sequence diagram illustrating interoperation of processes implemented by the secure authorization system of FIG. 1 in accordance with another example of the present disclosure.

FIG. 2B is a sequence diagram that illustrates one example of an authorization phishing protection process 240. As shown in FIG. 2B, the process 240 includes inter-operations between the computer-implemented processes illustrated in FIG. 1 that collectively prevent authorization phishing, while not substantially hampering authorization of legitimate applicant applications.

The process 240 includes many of the operations described above with reference to FIG. 2A. Redundant descriptions of those operations are omitted here for purposes of brevity. Turning to operation 242, the browser attempts to transmit an authentication response 242 (e.g., the authentication response 118 of FIG. 1) to the authorization server. The authentication response 242 can include authentication information and grant information.

Continuing with the process 240, the secure authorization service detects and stores 243 the authentication response 242 prior to its reception by the authorization server. The detection can be accomplished using any combination of a variety of techniques including, for example, code injection via a browser helper object (BHO)/extension to the browser; registration of the browser as a URI scheme handler of authentication response URIs; scripting of a proxy server utilized by the browser; inspection of communications from the browser via a gateway appliance, or the like. In some examples, to detect the authentication response 242, the secure authorization service monitors messages from the browser for addresses of authorization servers. These addresses may be pre-recorded via interaction between administrative personnel and the secure authorization service. This interaction can include receiving input specifying the addresses (e.g., via direct entry of the addresses and/or via automated extraction of the addresses from authorization workflows conducted using administrative accounts). For instance, in one example, a message from the browser may include a URL comprising "https://ogin.microsoftonline.com/". In these examples, the secure authorization service matches (e.g., identifies equivalency between) a portion of the URL and a previously recorded URI string—"https://login.microsoftonline.com/" and, therefore, identifies the message as an authentication response. The previous recorded URI string may be a complete URI or a portion thereof.

In certain examples, where an authorization server is specific to a tenant of a multitenant cloud computing service and the authorization server is specific to the tenant, the recorded URI can include a tenant identifier to narrow the number of messages identified as authentication responses and, thereby, conserve computing resources consumed by the secure authorization service. For instance, a message from the browser may include a URL comprising https://login.microsoftonline.com/335836de-42ef-43a2-b145-348c2ee9ca5b. In these examples, the secure authorization service matches the URL to a previously recorded URI string that includes the tenant identifier "335836de-42ef-43a2-b145-348c2ee9ca5b" and identifies the message as an authentication response, provided that the message also identifies an authorization server or other identity provider. Conversely, in these examples, the secure authorization service does not identify a message as an authentication response unless the message includes at least one URI string (e.g., a pre-recorded URI string). It should be noted that examples that implement this technique can be configured to not interfere with personal use of the browser by pre-recording only URI strings that include identifiers of tenants who subscribe to the secure authorization service.

Alternatively or additionally, in some examples, to detect authentication responses, the secure authorization service monitors messages from the browser for other values indicative of authentication responses. These other values can include string values that commonly appear within authentication responses. For example, the string values can include "username", "password", or the like. Moreover, depending on the specificity and sensitivity desired, to detect authentication responses, some examples of the secure authorization service monitor messages for string values that are arranged according to commonly used syntax. In these examples, the secure authorization service monitors messages for the string values (e.g., "username" and "password") specified in a particular order. In these examples, the secure authorization service identifies messages as authentication responses where the string values are identified according to any required syntax in the messages. Conversely, in these examples, the secure authorization service does not identify a message as an authentication response where the string values are not identified within the message or the string values within the message do not comply with a required syntax. It should be noted that these string values and syntax requirements can be pre-recorded via interaction between the secure authorization service and administrative personnel. This interaction can include receiving input specifying the values indicative of authentication responses (e.g., via direct entry of the values and/or via automated extraction of the values from authorization workflows conducted using administrative accounts). It should also be noted that these examples do not rely on a unique identifier of an identity provider or authorization server to be effective. As such, these examples can secure authorization requests addressed to any identity or authorization server, including multiple servers owned by different parties.

Continuing with the process 240, the secure authorization service conditionally determines 244 the legitimacy of the authorization request 206. For instance, in some examples, the secure authorization service determines whether the account identified in the authentication response 242 is designated for protection. This determination can be accomplished, for example, by searching for the account (e.g., "personal_account@gmail.com", "corp_marketing@gmail.com", etc.) in a pre-recorded list of protected accounts. Alternatively or additionally, certain examples of the secure authorization service determine whether the account is designated for protection by searching an identifier of the account, or a subset thereof, for domain string (e.g., "bigcorp.com") from a pre-recorded list of domain strings. In either case, the list of protected accounts and/or the list of domain strings may be used to identify professional accounts for users. This configuration enables the secure authorization service to apply administrative policy and protection to professional accounts, while giving users freedom to use personal accounts according to their wishes. It should be noted that these accounts lists and/or domain string values can be pre-recorded via interaction between the secure authorization service and administrative personnel. This interaction can include receiving input specifying the values indicative of authorization requests (e.g., via direct entry of the values and/or via automated extraction of the values from authorization workflows conducted using administrative accounts).

Continuing with the operation 244, where the account specified in the authentication response 242 is designated for protection, the secure authorization service inspects the stored authorization request 206 to determine whether an indication of authorization phishing is present therein. In some examples, the indication of authorization phishing includes the presence or absence of identifiers of certain applicant applications. For instance, in examples directed to authorization processes that utilize redirection (e.g., OAuth 2.0), the secure authorization service parses authorization requests to extract parameters and attempts to match the extracted parameters to identifiers (e.g., pre-recorded identifiers) of applicant applications and/or redirection URI's (e.g., pre-recorded redirection URIs) associated with applicant applications. For instance, in one example, the authorization request 206 may include a URL comprising "client_id=c2a75407-ba9b-4a60-b798-1259f64b4a70" and/or "redirect_uri=https://sneaky-app.com/callback". In this example, the secure authorization service parses the authorization request 206 to extract the identifier of the applicant application ("c2a75407-ba9b-4a60-b798-1259f64b4a70") and/or the redirection URI parameter ("https://sneaky-app.com/callback"). It should be noted that the redirection URI parameter can include a tenant identifier, in some examples.

Further, in examples where the secure authorization service maintains an unsafe list (e.g., the unsafe list 126 of FIG. 1) of URI strings, the secure authorization service determines whether one or more of the extracted parameters match (e.g., are equivalent to or include) one or more entries in the unsafe list. In certain examples, the secure authorization service identifies the authorization request 206 as an authorization phishing message where one or more of the extracted parameters match one or more entries in the unsafe list. Alternatively or additionally, in certain examples, the secure authorization service identifies the authorization request 206 as a legitimate authorization request where one or more of the extracted parameters do not match one or more entries in the unsafe list. In these examples, the unsafe list is assumed to be complete. Alternatively or additionally, in examples where the secure authorization service maintains a safe list (e.g., the unsafe list 124 of FIG. 1), the secure authorization service determines whether one or more of the extracted parameters match (e.g., are equivalent to or include) one or more entries in the safe list. In these examples, the secure authorization service identifies the authorization request 206 as an authorization phishing message where none of the extracted parameters match one or more entries in the safe list. Alternatively or additionally, in examples where the secure authorization service maintains a safe list, the secure authorization service identifies the authorization request 206 as a legitimate authorization request where one or more of the extracted parameters match one or more entries in the safe list.

Continuing with the process 240, where the secure authorization service determines that the authorization request 206 is an authorization phishing message, the authorization service responds to the authorization request with a denial response 246 and/or prevents the authentication response 242 from reaching the authorization server. The denial response 246 may include HTML that, when rendered by the browser, indicates to a user that the authorization request was a phishing attack. To prevent the authorization request 206 from reaching the authorization server, some examples of the secure authorization service terminate browser processing of the URI 202 prior to any interoperation between the browser and the authorization server. Alternatively or additionally, some examples of the secure authorization service that can affect communications between the browser and the authorization server do not forward and/or block further communication of the authentication response 242.

Continuing with the process 240, where the secure authorization service determines that the authorization request 206 is a legitimate authorization request 214, the secure authorization service transmits an authentication response 248 (i.e. releases a copy of the authentication response 242) to the authorization server and the process 240 continues to completion.

It should be noted that the secure authorization service can execute the process 240 to customize the protection provided to users. Consider, for example, a case in which a company seeks to restrict the set of applicant applications that can be authorized to access company resources in a popular social media website. Given the popularity of the social media website, employees may have both personal and corporate accounts with the social media website. Personal accounts may be associated with a username that specifies a first domain (e.g., "gmail.com") while professional accounts may be associated with a username that specifies a second domain (e.g., "bigcorp.com"). In such an example, the secure authorization service can execute the process 240 to selectively restrict (by detecting the domain string "bigcorp.com") the applicant applications that access resources of corporate accounts while allowing potentially any applicant application to access resources of personal accounts. This feature enables the secure authorization service protects corporate accounts while giving employees freedom regarding their personal accounts.

In another example, the company seeks to restrict the set of applicant applications that can be authorized to access company resources in a popular email website. Given the popularity of the email website, employees may have both personal and corporate accounts with the email website. An employee's personal account may be associated with a personal username (e.g., "personal_account@gmail.com") while the company's email account may be associated with a corporate username (e.g., "corp_marketing@gmail.com"). In such an example, the secure authorization service can execute the process 240 to selectively restrict (by detecting the corporate username "corp_marketing@gmail.com") the applicant applications that access resources of corporate accounts while allowing potentially any applicant application to access resources of personal accounts associated with personal usernames. This feature enables the secure authorization service protects corporate accounts while giving employees freedom regarding their personal accounts.

Figure 3A:
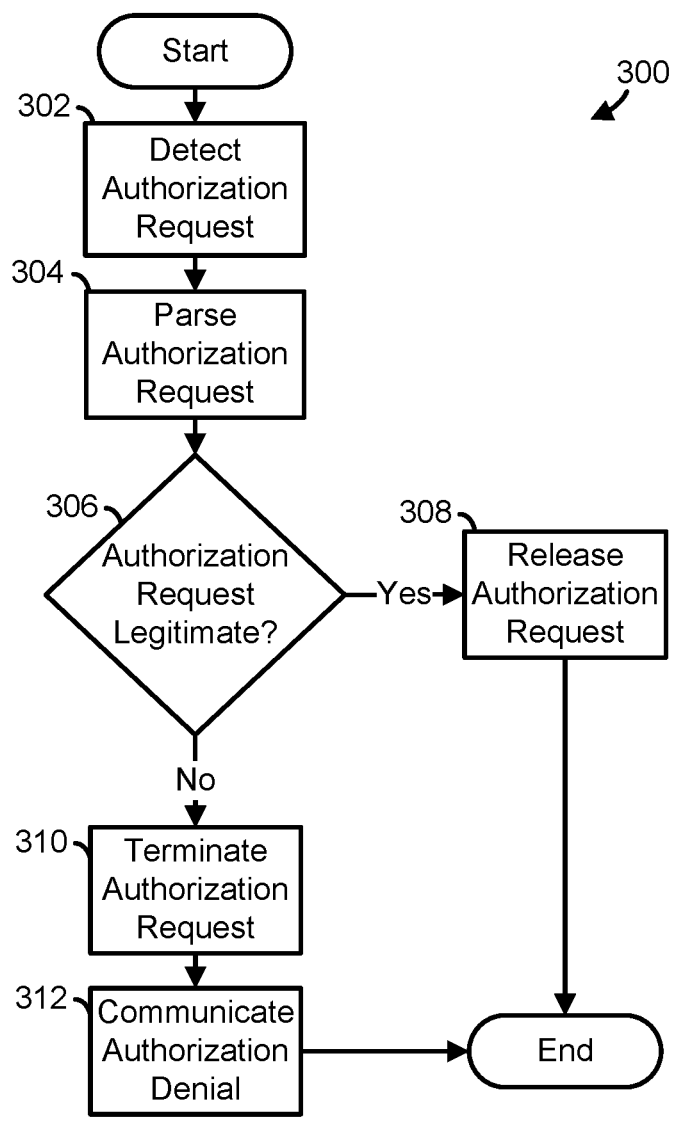
FIG. 3A is a flow diagram of a secure authorization process in accordance with an example of the present disclosure.

FIG. 3A is a flow diagram illustrating a process 300 useful to protect resources from authorization phishing attacks. The process 300 can be executed, for example, by a secure authorization service (e.g., the secure authorization service 108 of FIG. 1).

As shown in FIG. 3A, the process 300 starts with the secure authorization service detecting 302 an authorization request (e.g., the authorization request 106 of FIG. 1). For instance, in some examples, the secure authorization service detects the authorization request by matching at least a portion of a message to a previously recorded identifier of an authorization server, such as an address of the authorization server. This previously recorded identifier can be, for example, a URL or a portion thereof. It should be noted that, in some of these examples, the detection operation 302 may be referred to as "interception" where the address of the authorization server is different from an address of the process 300.

Continuing with the process 300, the secure authorization service parses 304 the detected authorization request to extract parameters thereof. For instance, in examples directed to authorization processes that utilize redirection (e.g., OAuth 2.0), the secure authorization service extracts parameters such as an identifier of the applicant application and/or a redirection URI. It should be noted that parameter extraction involves identifying the parameter within the authorization request and reading the parameter to determine its value.

Continuing with the process 300, the secure authorization service determines 306 whether the detected authorization request is legitimate. For instance, in examples directed to authorization processes that utilize redirection (e.g., OAuth 2.0), the secure authorization service inspects the detected authorization request for values (e.g., pre-recorded parameter values) that are associated with an unsafe list (e.g., the unsafe list 126 of FIG. 1) and/or inspects the detected authorization request for values that are not associated with a safe list (e.g., the safe list 124 of FIG. 1). In these examples, where unsafe parameter values are included and/or safe parameter values are omitted, the secure authorization service determines 306 that the authorization request is an authorization phishing message. Also, in these examples, where unsafe parameter values are omitted and/or safe parameter values are included, the secure authorization service determines 306 that the authorization request is a legitimate authorization request. In these examples, the parameter values inspected for can include an identifier of the applicant application and/or a redirection URI, and the method of inspection can include string comparison.

Continuing with the process 300, the secure authorization service releases or otherwise delivers 308 the legitimate authorization request to the authorization server. For instance, in examples where the secure authorization service identifies a legitimate authorization request prior to its transmission from the browser, the secure authorization service allows communication of the legitimate authorization request to the authorization server. Alternatively or additionally, in examples where the secure authorization service identifies a legitimate authorization request after its transmission from the browser but prior to its reception at the authorization server, the secure authorization service forwards the legitimate authorization request to the authorization server. Subsequent to the execution of the operation 308, the process 300 ends.

Continuing with the process 300, the secure authorization service terminates 310 the illegitimate authorization request upon determination that the request is illegitimate (e.g., a phishing attack). For instance, in examples where the secure authorization service identifies an authorization request as a phishing message prior to its transmission from the browser, the secure authorization service prevents communication of the authorization request from the browser. Alternatively or additionally, in examples where the secure authorization service identifies an authorization request as a phishing message after its transmission from the browser but prior to its reception at the authorization server, the secure authorization service blocks the authorization request.

Continuing with the process 300, the secure authorization service communicates 312 an authorization denial. Such communication 312 can include transmission and/or rendering of HTML via the browser. The denial may include HTML that, when rendered by the browser, indicates to a user that the authorization request was a phishing attack. Subsequent to the execution of the operation 312, the process 300 ends.

Figure 3B:
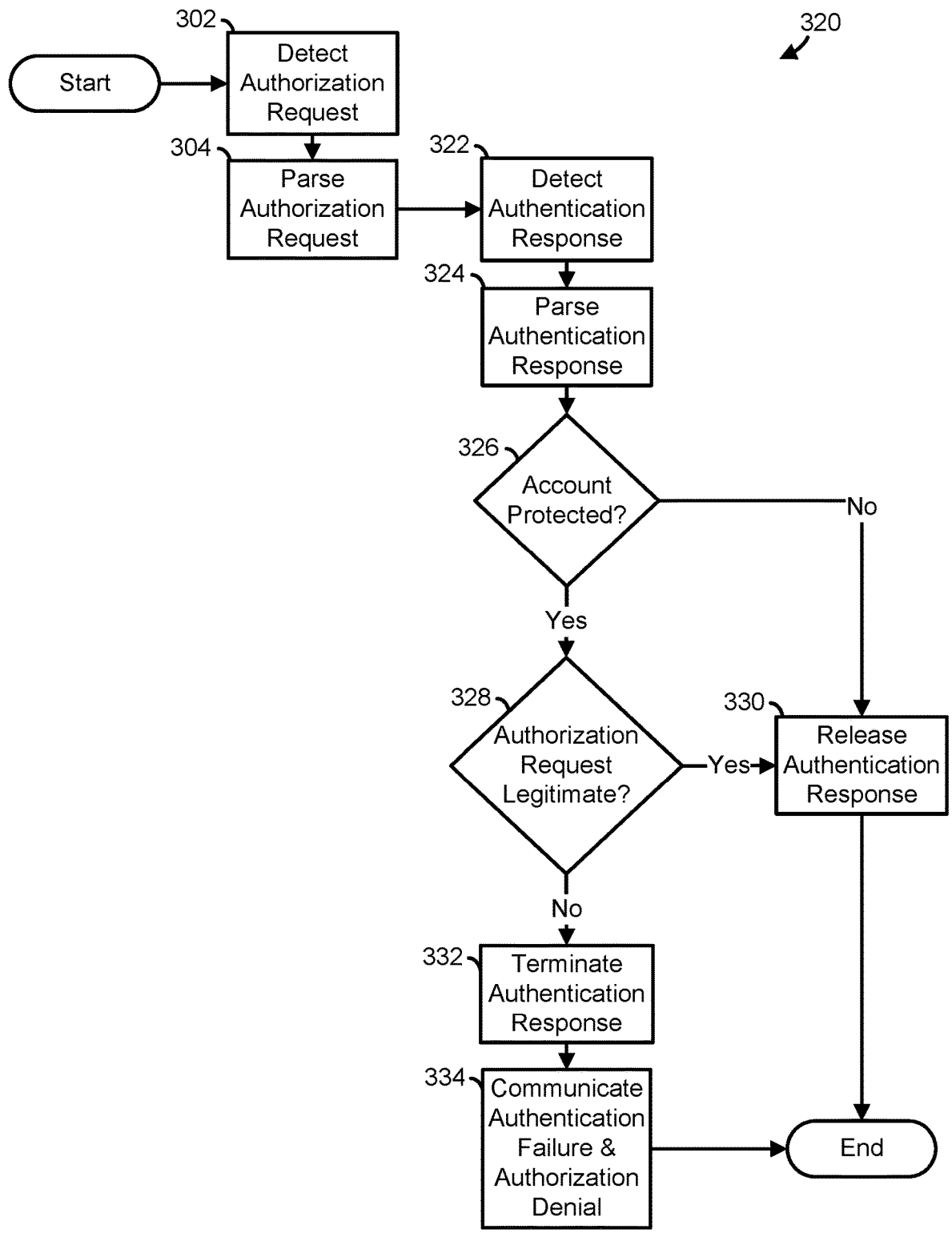
FIG. 3B is a flow diagram of a secure authorization process in accordance with another example of the present disclosure.

FIG. 3B is a flow diagram illustrating a process 320 useful to protect resources from authorization phishing attacks. The process 320 can be executed, for example, by a secure authorization service (e.g., the secure authorization service 108 of FIG. 1).

As shown in FIG. 3B, the process 320 starts with the secure authorization service detecting 302 an authorization request (e.g., the authorization request 106 of FIG. 1). For instance, in some examples, the secure authorization service detects the authorization request by matching at least a portion of a message to a previously recorded identifier of an authorization server, such as an address of the authorization server. This previously recorded identifier can be, for example, a URL or a portion thereof. It should be noted that, in some of these examples, the detection operation 302 may be referred to as "interception" where the address of the authorization server is different from an address of the process 320.

Continuing with the process 320, the secure authorization service parses 304 the detected authorization request to extract parameters thereof. For instance, in examples directed to authorization processes that utilize redirection (e.g., OAuth 2.0), the secure authorization service extracts parameters such as an identifier of the applicant application and/or a redirection URI. It should be noted that parameter extraction involves identifying the parameter within the authorization request and reading the parameter to determine its value.

Continuing with the process 320, the secure authorization service detects 322 an authentication response (e.g., the authentication response 118 of FIG. 1). For instance, in some examples, the secure authorization service detects the authentication response by matching at least a portion of a message to a previously recorded identifier of an authorization server, such as an address of the authorization server. This previously recorded identifier can be, for example, a URL or a portion thereof. It should be noted that, in some of these examples, the detection operation 302 may be referred to as "interception" where the address of the authorization server is different from an address of the process 320.

Continuing with the process 320, the secure authorization service parses 304 the detected authentication response to extract parameters thereof. For instance, in some examples, these parameters may include "username", "account", or some other parameter that identifies an account involved in authentication and/or grant. It should be noted that parameter extraction involves identifying the parameter within the authorization request and reading the parameter to determine its value.

Continuing with the process 320, the secure authorization service determines 326 whether the account identified in the authentication response is designated for protection. For instance, in some examples, the secure authorization service inspects the detected authentication response for values (e.g., pre-recorded parameter values) that are associated with a protected account list/protected domain list. In these examples, where protected account/domain parameter values are included in the authentication response, the secure authorization service determines 326 that the account is a protected account and proceeds to operation 328. Where protected account/domain parameter values are not included in the authentication response, the secure authorization service determines 326 that the account is not a protected account and proceeds to operation 330. It should be noted that the parameter values can be inspected for values using, for example, string comparison.

Continuing with the process 320, the secure authorization service determines 328 whether the detected authorization request is legitimate. For instance, in examples directed to authorization processes that utilize redirection (e.g., OAuth 2.0), the secure authorization service inspects the detected authorization request for values (e.g., pre-recorded parameter values) that are associated with an unsafe list (e.g., the unsafe list 126 of FIG. 1) and/or inspects the detected authorization request for values that are not associated with a safe list (e.g., the safe list 124 of FIG. 1). In these examples, where unsafe parameter values are included and/or safe parameter values are omitted, the secure authorization service determines 306 that the authorization request is an authorization phishing message. Also, in these examples, where unsafe parameter values are omitted and/or safe parameter values are included, the secure authorization service determines 328 that the authorization request is a legitimate authorization request. In these examples, the parameter values inspected for can include an identifier of the applicant application and/or a redirection URI and the method of inspection can include string comparison.

Continuing with the process 320, the secure authorization service releases or otherwise delivers 330 the legitimate authorization request to the authorization server. For instance, in examples where the secure authorization service identifies a legitimate authorization request prior to its transmission from the browser, the secure authorization service allows communication of the legitimate authorization request to the authorization server. Alternatively or additionally, in examples where the secure authorization service identifies a legitimate authorization request after its transmission from the browser but prior to its reception at the authorization server, the secure authorization service forwards the legitimate authorization request to the authorization server. Subsequent to the execution of the operation 330, the process 320 ends.

Continuing with the process 320, the secure authorization service terminates 332 the illegitimate authorization request upon determination that the request is illegitimate (e.g., a phishing attack). For instance, in examples where the secure authorization service identifies an authorization request as a phishing message prior to its transmission from the browser, the secure authorization service prevents communication of the authorization request from the browser. Alternatively or additionally, in examples where the secure authorization service identifies an authorization request as a phishing message after its transmission from the browser but prior to its reception at the authorization server, the secure authorization service blocks the authorization request.

Continuing with the process 320, the secure authorization service communicates 334 an authorization denial. Such communication 334 can include transmission and/or rendering of HTML via the browser. The denial may include HTML that, when rendered by the browser, indicates to a user that the authorization request was a phishing attack. Subsequent to the execution of the operation 312, the process 320 ends.

Computing Devices for Secure Authorization Systems

Figure 4:
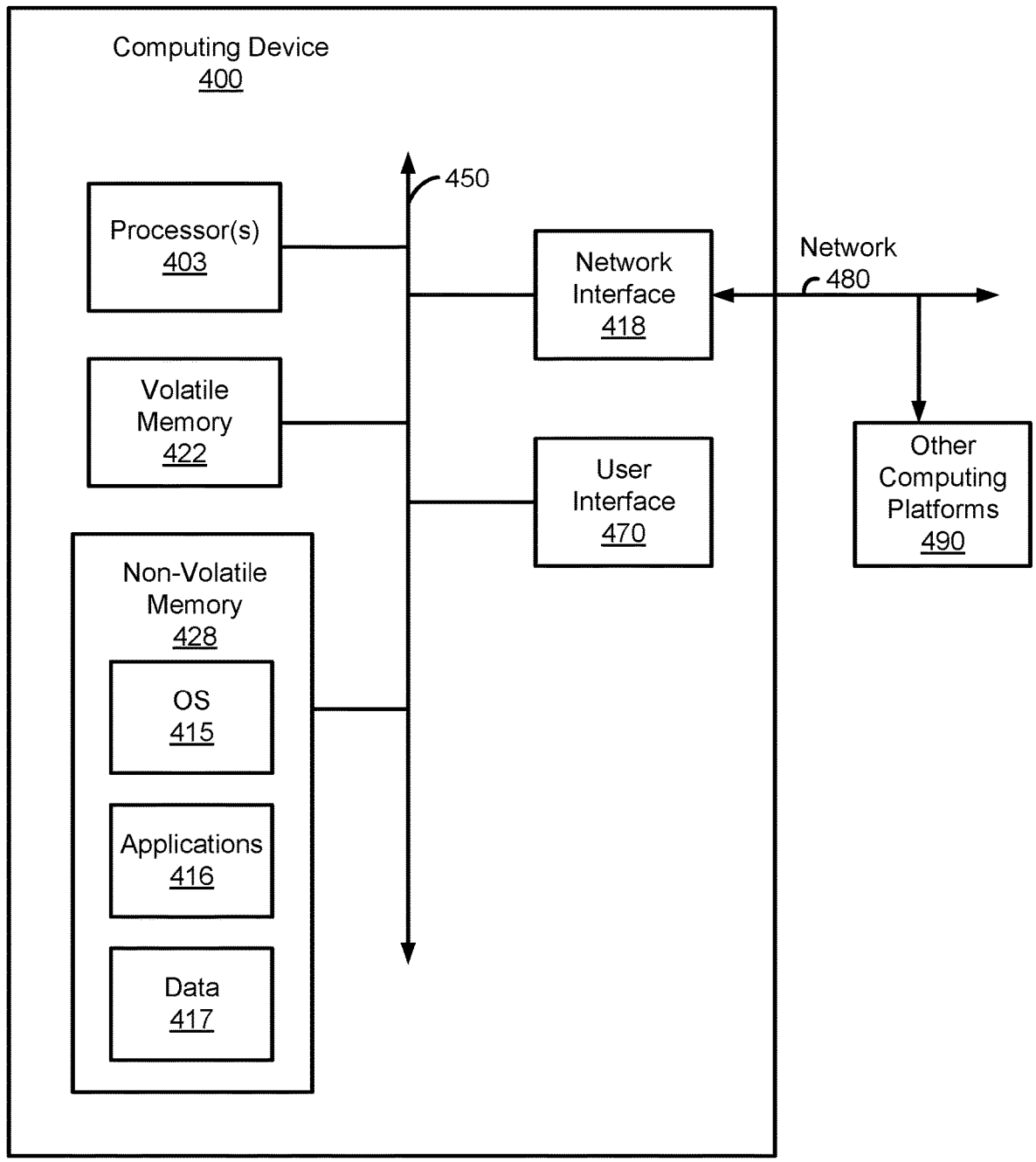
FIG. 4 is a block diagram of a network environment of computing devices in which various aspects of the present disclosure can be implemented.

FIG. 4 is a block diagram of a computing device 400 configured to implement various secure authorization systems and processes in accordance with examples disclosed herein.

The computing device 400 includes one or more processor(s) 403, volatile memory 422 (e.g., random access memory (RAM)), non-volatile memory 428, a user interface (UI) 470, one or more network or communication interfaces 418, and a communications bus 450. The computing device 400 may also be referred to as a client device, computing device, endpoint device, computer, or a computer system.

The non-volatile (non-transitory) memory 428 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 470 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, one or more accelerometers, one or more visors, etc.).

The non-volatile memory 428 stores an operating system 415, one or more applications or programs 416, and data 417. The operating system 415 and the application 416 include sequences of instructions that are encoded for execution by the processor(s) 403. Execution of these instructions results in manipulated data. Prior to their execution, the instructions can be copied to the volatile memory 422. In some examples, the volatile memory 422 can include one or more types of RAM and/or a cache memory that can offer a faster response time than a main memory. Data can be entered through the user interface 470 or received from the other I/O device(s), such as the network interface 418. The various elements of the device 400 described above can communicate with one another via the communications bus 450.

The illustrated computing device 400 is shown merely as an example client device or server and can be implemented within any computing or processing environment with any type of physical or virtual machine or set of physical and virtual machines that can have suitable hardware and/or software capable of operating as described herein.

The processor(s) 403 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 403 can be analog, digital or mixed. In some examples, the processor(s) 403 can be one or more local physical processors or one or more remotely-located physical processors. A processor including multiple processor cores and/or multiple processors can provide functionality for parallel, simultaneous execution of instructions or for parallel, simultaneous execution of one instruction on more than one piece of data.

The network interfaces 418 can include one or more interfaces to enable the computing device 400 to access a computer network 480 such as a Local Area Network (LAN), a Wide Area Network (WAN), a Personal Area Network (PAN), or the Internet through a variety of wired and/or wireless connections, including cellular connections and Bluetooth connections. In some examples, the network 480 may allow for communication with other computing devices 490, to enable distributed computing. The network 480 can include, for example, one or more private and/or public networks over which computing devices can exchange data.

In described examples, the computing device 400 can execute an application on behalf of a user of a client device. For example, the computing device 400 can execute one or more virtual machines managed by a hypervisor. Individual virtual machines can provide an execution session within which applications execute on behalf of a user or a client device, such as a hosted desktop session. The computing device 400 can also execute a terminal services session to provide a hosted desktop environment. The computing device 400 can provide access to a remote computing environment including one or more applications, one or more desktop applications, and one or more desktop sessions in which one or more applications can execute.

Figure 5:
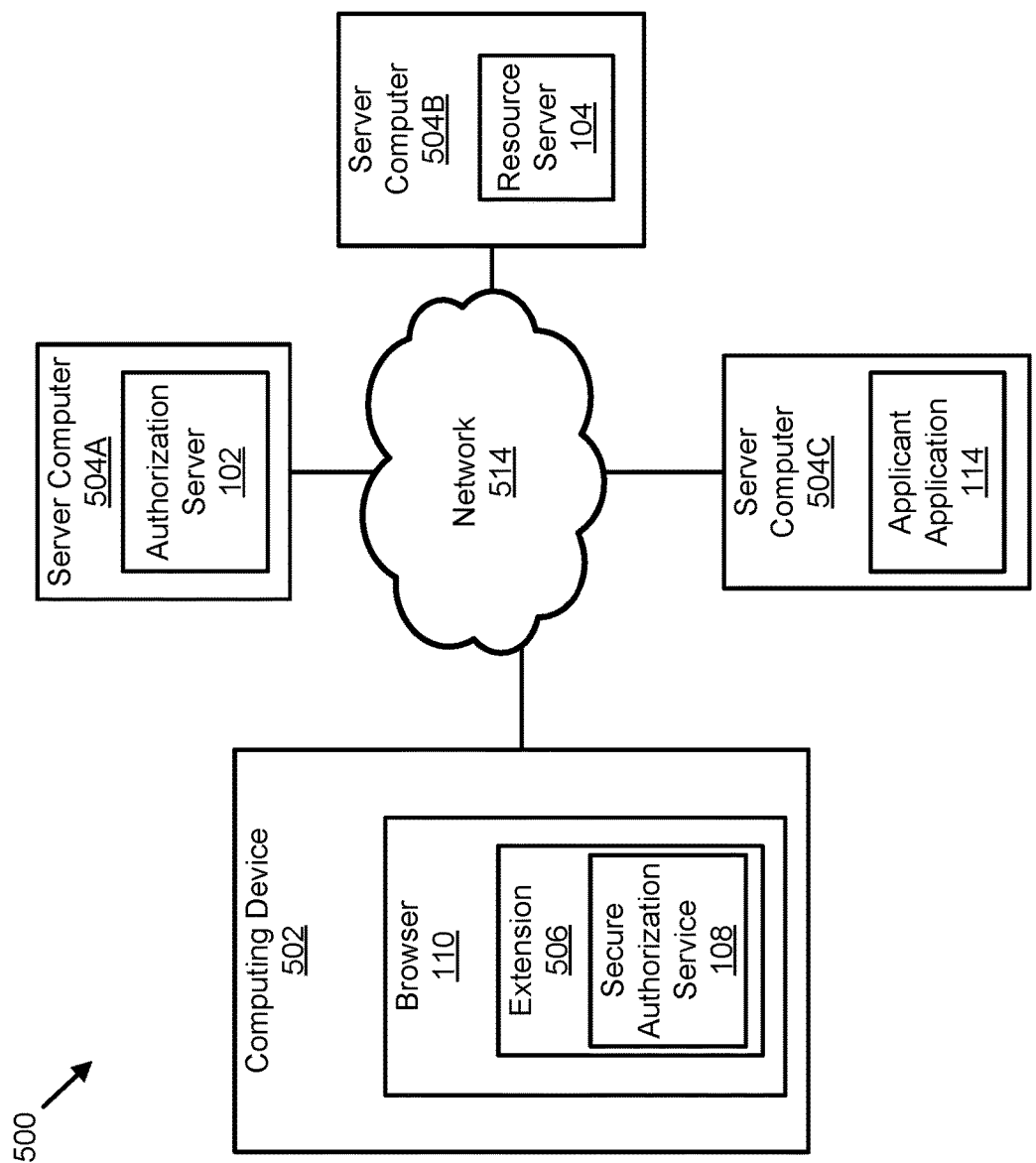
FIG. 5 is a block diagram of the secure authorization system of FIG. 1 as implemented by a configuration of computing devices in accordance with an example of the present disclosure.

FIG. 5 illustrates a secure authorization system (e.g., the secure authorization system 100 of FIG. 1) configured for operation within a distributed computing system 500 comprising computing devices. As shown in FIG. 5, the distributed computing system 500 includes server computers 504A-504C that are configured to interoperate with one another and an endpoint computing device 502 via a network 514.

The server computer 504A is configured to host the authorization server 102 of FIG. 1. The server computer 504B is configured to host the resource server 104 of FIG. 1. The server computer 504C is configured to host an applicant application 114 of FIG. 1. The endpoint device 502 is configured to host the browser 110 of FIG. 1. Examples of the endpoint computing device 502 and the server computers 504A-504C include the computing device 400 of FIG. 4.

As shown in FIG. 5, the secure authorization service 108 of FIG. 1 is configured as an extension 506 of the browser 110. This implementation provides a number of advantages. For instance, by being integrated with the browser the secure authorization service 108 can detect authorization requests via a handler of webNavigation events generated by browser processing. In addition, the secure authorization service 108 can access the transitionType property to identify the source (e.g., browser-side code or server-side code) of redirects executed by the browser, thus providing another potential way to identify the authorization server and/or an applicant application. Moreover, the secure authorization service 108 can terminate identified authorization requests that are phishing messages by preventing the browser from transmitting identified authorization requests to the network 514 and can communicate authorization denials locally. Additionally, where a detected authorization request is identified as being legitimate, the secure authorization service can release the legitimate authorization request by allowing normal browser processing to continue.

Figure 6:
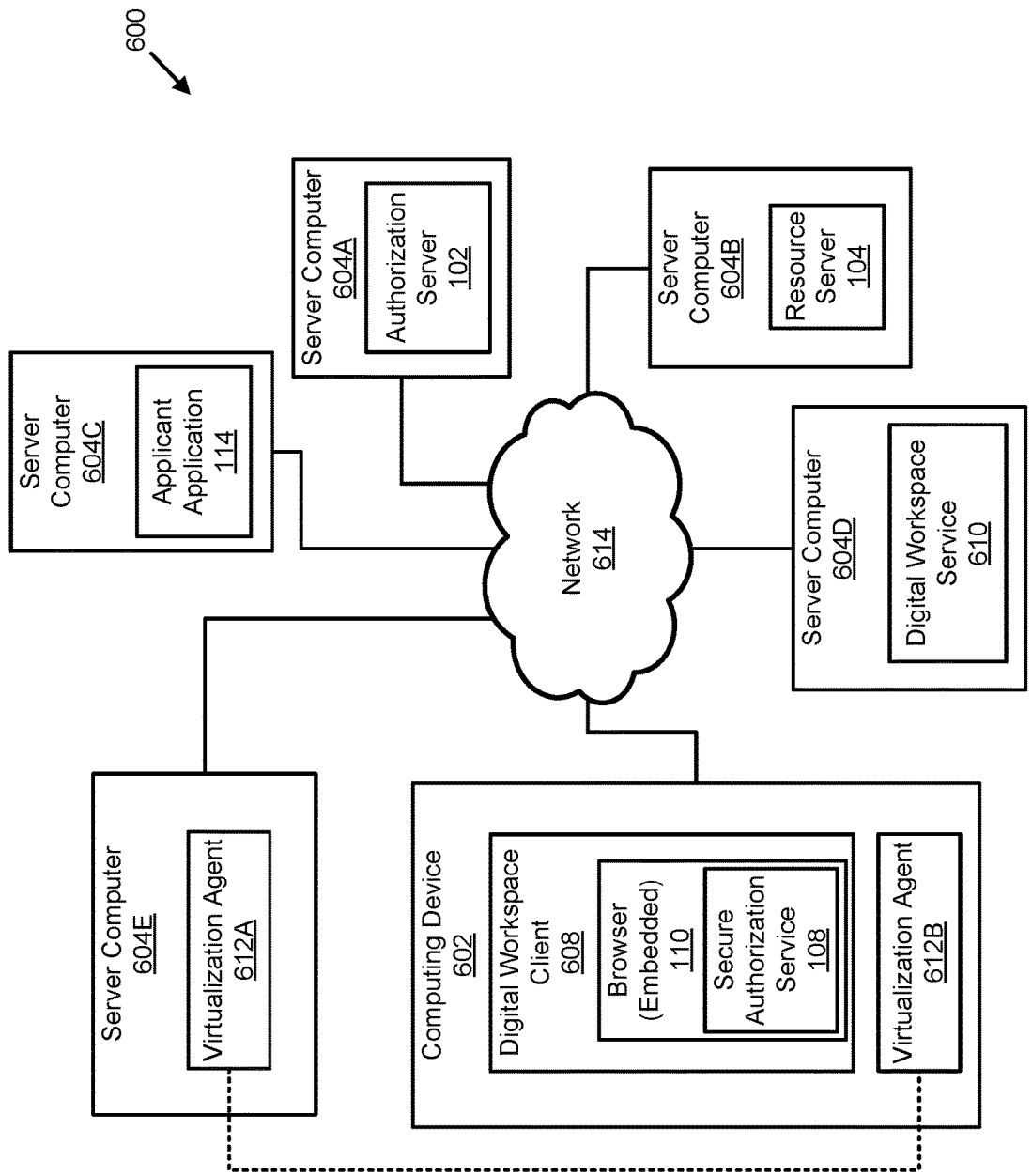
FIG. 6 is a block diagram of the secure authorization system of FIG. 1 as implemented by a configuration of computing devices in accordance with another example of the present disclosure.

FIG. 6 illustrates a secure authorization system (e.g., the secure authorization system 100 of FIG. 1) configured for operation within a distributed computing system 600 comprising computing devices. As shown in FIG. 6, the distributed computing system 600 includes server computers 604A-604E that are configured to interoperate with one another and an endpoint computing device 602 via a network 614.

The server computer 604A is configured to host the authorization server 102 of FIG. 1. The server computer 604B is configured to host the resource server 104 of FIG. 1. The server computer 604C is configured to host an applicant application 114 of FIG. 1. The server computer 604D is configured to host a digital workspace service 610, such as the Citrix Workspace™ service. The server computer 604E is configured to host a virtualization agent 612A. The endpoint device 602 is configured to host a digital workspace client 608 and a virtualization agent 612B. As shown in FIG. 6, the digital workspace client 608 incorporates the browser 110 of FIG. 1. The browser 110, in turn, incorporates the secure authorization service 108 of FIG. 1. Examples of the endpoint computing device 602 and the server computers 604A-604E include the computing device 400 of FIG. 4.

As shown in FIG. 6, the virtualization agent 612A and the virtualization agent 612B are configured to interoperate within a virtualization infrastructure. This virtualization infrastructure enables an application executing within a first physical computing environment (e.g., the server computer 604E) to be accessed by a user of a second physical computing environment (e.g., the endpoint computing device 602) as if the application was executing within the second physical computing environment. Within the virtualization infrastructure, the virtualization agent 612A is configured to make a computing environment in which it operates available to execute virtual computing sessions. The virtualization agent 612A can be further configured to manage connections between these virtual computing sessions and other processes within the virtualization infrastructure, such as the virtualization agent 612B. In a complementary fashion, the virtualization agent 612B is configured to instigate and connect to the virtual computing sessions managed by the virtualization agent 612A. The virtualization agent 612B is also configured to interoperate with other processes executing within its computing environment (e.g., the digital workspace client 608) to provide those processes with access to the virtual computing sessions and the virtual resources therein. Within the context of a Citrix HDX™ virtualization infrastructure, the virtualization agent 612A can be implemented as, for example, a virtual delivery agent installed on a physical or virtual server or desktop and the virtualization agent 612B can be implemented as a local service in support of the digital workspace client 608. In this context, the digital workspace client 608 can include, for example, a Citrix Workspace™ client or Citrix Receiver™ for hypertext markup language (HTML) 5 browsers. In some examples, the digital workspace client 608 includes an embedded browser. The embedded browser can be implemented, for example, using the Chromium Embedded Framework.

Continuing with the example illustrated in FIG. 6, the digital workspace client 608 and the digital workspace service 610 collectively implement a digital workspace application. This digital workspace application is configured to deliver and manage a user's applications, data, and desktops in a consistent and secure manner, regardless of the user's device or location. The digital workspace application enhances the user experience by streamlining and automating those tasks that a user performs frequently, such as approving expense reports, confirming calendar appointments, submitting helpdesk tickets, and reviewing vacation requests. The workspace application allows users to access functionality provided by multiple enterprise applications—including SaaS applications, web applications, desktop applications, and proprietary applications—through a single interface rendered by the digital workspace client 608.

In certain examples, the digital workspace service 610 is configured to control the applications, data, and desktops that users may access via the digital workspace client 608 and to help establish connections between the digital workspace client 608 and the available applications, data, and desktops. As such, the digital workspace service 610 exposes and implements an administrative interface configured to interact with administrators. The digital workspace service 610 is configured to receive, via this administrative interface, configuration information that specifies the applications, data, and desktops that users may access via the digital workspace client 608. The digital workspace service 610 is further configured to receive and record, via the administrative interface, URI strings specifying authorization server addresses and lists (e.g., safe lists, such as the safe list 124 of FIG. 1, and/or unsafe lists, such as the unsafe list 126 of FIG. 1) used by the secure authorization service 108 as described above. The digital workspace service 610 is also configured to receive and record, via the administrative interface, account usernames and domain strings specifying groups of accounts used by the secure authorization service 108 as described above.

As shown in FIG. 6, the secure authorization service 108 of FIG. 1 is integrated with the browser 110, which is embedded within the digital workspace client 608. This implementation provides the advantages of the in-extension implementation of the secure authorization service 108 described above with reference to FIG. 5.

Figure 7:
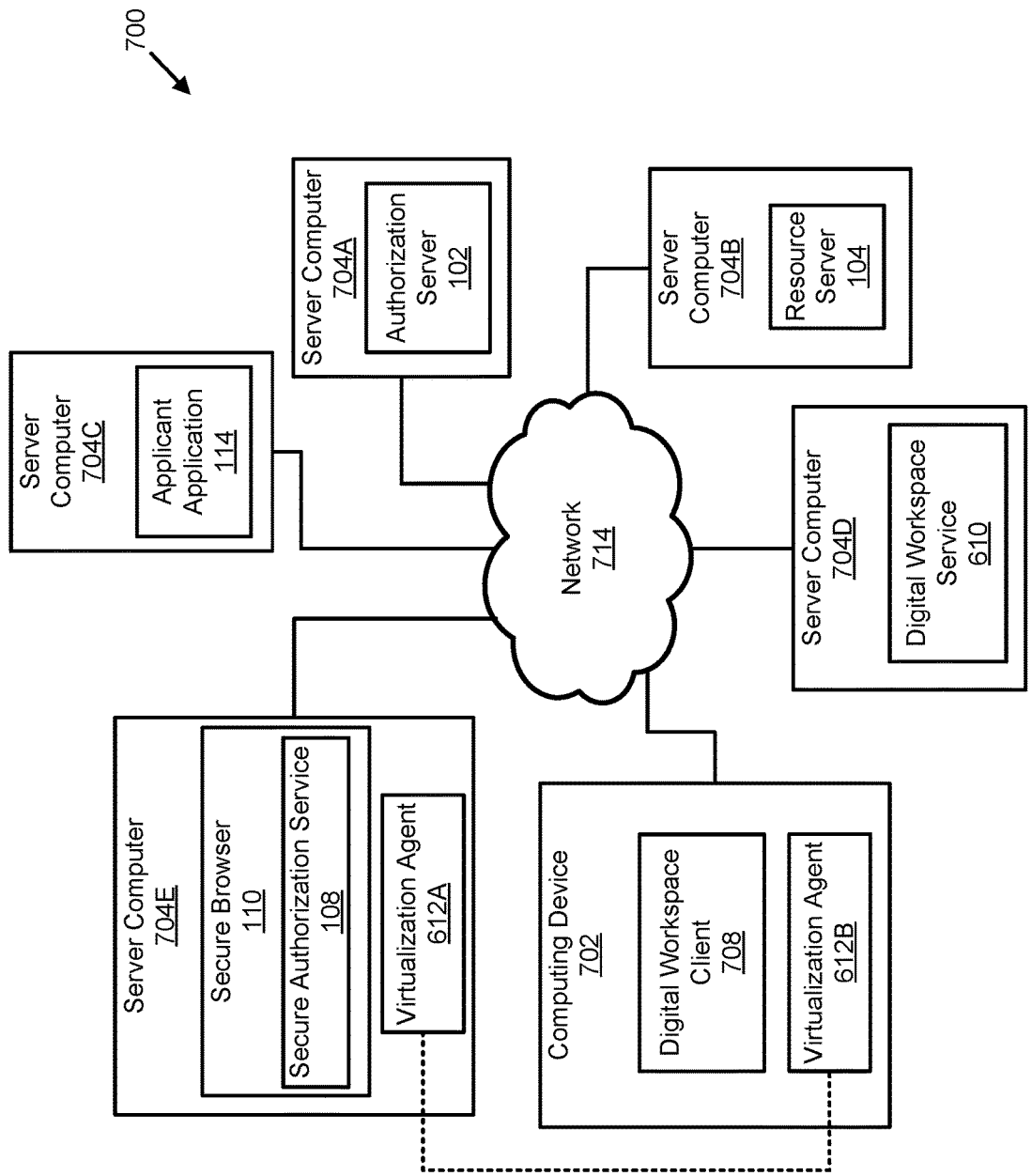
FIG. 7 is a block diagram of the secure authorization system of FIG. 1 as implemented by a configuration of computing devices in accordance with another example of the present disclosure.

FIG. 7 illustrates a secure authorization system (e.g., the secure authorization system 100 of FIG. 1) configured for operation within a distributed computing system 700 comprising computing devices. As shown in FIG. 7, the distributed computing system 700 includes server computers 704A-704E that are configured to interoperate with one another and an endpoint computing device 702 via a network 714.

The server computer 704A is configured to host the authorization server 102 of FIG. 1. The server computer 704B is configured to host the resource server 104 of FIG. 1. The server computer 704C is configured to host an applicant application 114 of FIG. 1. The server computer 704D is configured to host the digital workspace service 610 of FIG. 6. The server computer 704E is configured to host the browser 110 of FIG. 5 and a virtualization agent 612A of FIG. 6. The endpoint device 702 is configured to host a digital workspace client 708 and the virtualization agent 612B of FIG. 6. Examples of the endpoint computing device 702 and the server computers 704A-704E include the computing device 400 of FIG. 4.

As shown in FIG. 7, the digital workspace client 708 implements the functionality of the digital workspace client 608, but the browser 110 embedded within the digital workspace client 708 omits the secure authorization service 108. Rather, in examples illustrated by FIG. 7, the secure authorization service 108 is implemented within the browser 110. In this example, the browser 110 is a secure (virtual) browser accessible by the digital workspace client 708 via the virtualization infrastructure implemented by the virtualization agents 612A and 612B and the digital workspace service 610. This implementation provides the advantages of the in-browser implementation of the secure authorization service 108 described above with reference to FIG. 6 and, additionally, provides the enhanced security concomitant with a secure browser service.

Figure 8:
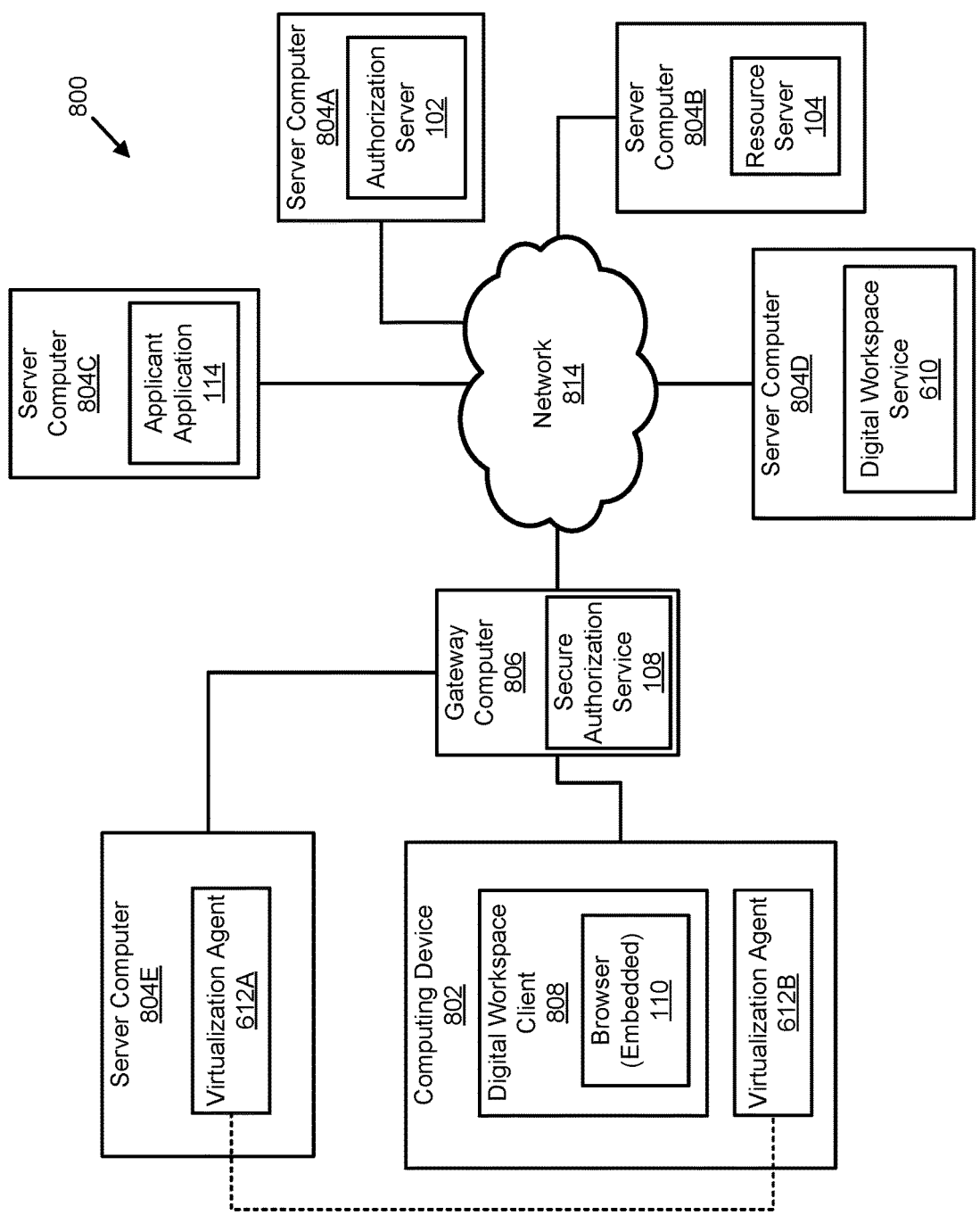
FIG. 8 is a block diagram of the secure authorization system of FIG. 1 as implemented by a configuration of computing devices in accordance with another example of the present disclosure.

FIG. 8 illustrates a secure authorization system (e.g., the secure authorization system 100 of FIG. 1) configured for operation within a distributed computing system 800 comprising computing devices. As shown in FIG. 8, the distributed computing system 800 includes server computers 804A-804D that are configured to interoperate with one another, an endpoint computing device 802, a gateway computer 806, and the server computer 804E via a network 814.

The server computer 804A is configured to host the authorization server 102 of FIG. 1. The server computer 804B is configured to host the resource server 104 of FIG. 1. The server computer 804C is configured to host an applicant application 114 of FIG. 1. The server computer 804D is configured to host the digital workspace service 610 of FIG. 6. The server computer 804E is configured to host the virtualization agent 612A of FIG. 6. The endpoint device 802 is configured to host a digital workspace client 808 and the virtualization agent 612B of FIG. 6. The gateway computer 806 is configured to host the secure authorization service 108. Examples of the endpoint computing device 802, the server computers 804A-804E, and the gateway computer 806 include the computing device 400 of FIG. 4.

As shown in FIG. 8, the digital workspace client 808 implements the functionality of the digital workspace client 708 of FIG. 7 but incorporates the embedded browser 110 that is monitored by the secure authorization service 108. In this example, the secure authorization service 108 is hosted by the gateway computer 806. In some examples, the gateway computer 806 is a part of the virtualization infrastructure along with the virtualization agent 612A, the virtualization agent 612B, the digital workspace client 808, and the digital workspace service 610. For instance, in some examples, the gateway computer 806 includes a CITRIX ADC appliance.

Implementation of the secure authorization service 108 within the gateway computer 806 provides multiple advantages. For instance, it enables one instance of the secure authorization service 108 to service multiple browsers. In addition, this implementation can ease the burden of maintaining instances of the secure authorization service 108 on multiple user machines. Further, as the gateway computer 806 is an intermediate device, the secure authorization service 108 is well-positioned to block authorization requests that are phishing messages received by the gateway computer 806, to allow legitimate authorization requests to flow unimpeded to the authorization server 102, and to transmit authorization denials to both users and administrative staff (e.g., via the digital workspace service 610).

Figure 9:
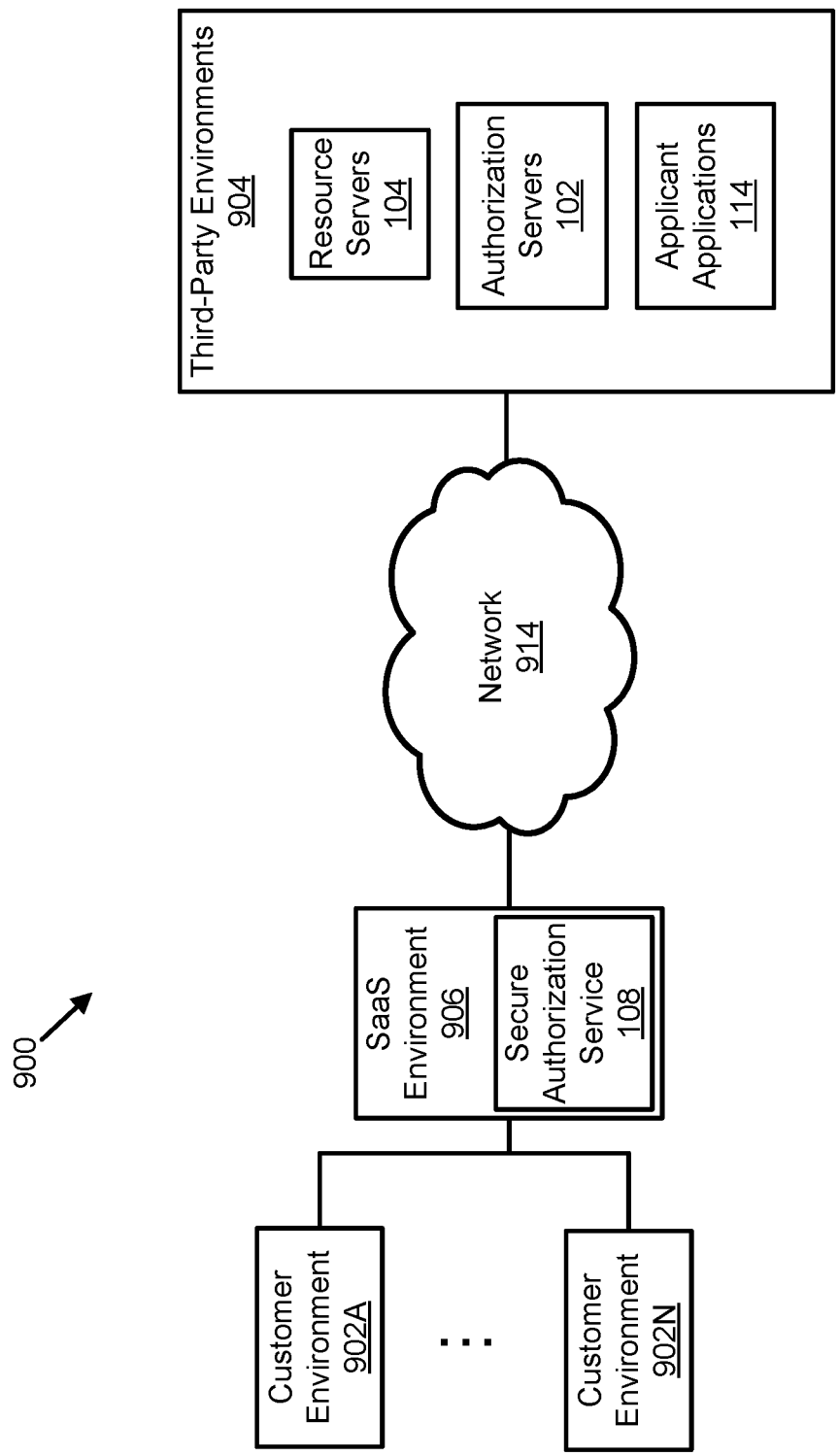
FIG. 9 is a block diagram of the secure authorization system of FIG. 1 as implemented in a Software as a Service (SaaS) system in accordance with another example of the present disclosure.

FIG. 9 illustrates a secure authorization system (e.g., the secure authorization system 100 of FIG. 1) configured for operation within a distributed computing system 900 comprising computing devices. As shown in FIG. 9, the distributed computing system 900 includes customer computing environments 902A-902N that are configured to interoperate with third party environments 904 via a SaaS environment 906 and a network 914.

The environments 902A-902N, 906, and 904 can individually include one or more computing devices in communication via a private network and/or one or more virtual computing devices hosted within a cloud computing service, such as Microsoft Azure™. As shown in FIG. 9, the SaaS environment 906 is configured to host the secure authorization service 108 of FIG. 1. The third-party environments 904 are configured to host pluralities of the authorization server 102, the resource server 104, and the applicant application 114 of FIG. 1. Examples of the computing devices used to implement the environments 902A-902N, 906, and 904 include the computing device 400 of FIG. 4.

As shown in FIG. 9, the secure authorization service 108 is hosted by the SaaS environment 906. Implementation of the secure authorization service 108 within the SaaS environment 906 provides multiple advantages. For instance, it enables one instance of the secure authorization service 108 to service multiple browsers operated by multiple customers. In addition, this implementation can ease the burden of maintaining more instances of the secure authorization service 108 on multiple user machines. Further, as the SaaS environment 906 is an intermediate environment, the secure authorization service 108 is well-positioned to block authorization requests that are phishing messages received by the SaaS environment 906, to allow legitimate authorization requests to flow unimpeded to the authorization servers 102, and to transmit authorization denials to both users and administrative staff. It should be noted that, to implement the configuration illustrated in FIG. 9, one or more computing devices within the customer environments 902A-902N are configured to pass at least some of the network traffic addressed to computing devices within the third-party networks through the SaaS environment. For instance, in some examples, an HTTP message addressed to a first API endpoint exposed and implemented by an authorization server 102 within the third-party environment is communicated to a second API endpoint exposed and implemented by the secure authorization service 108 for processing prior to being communicated to the first API endpoint.

The distributed computing systems 500-900 are but a few examples of many potential configurations that can be used to implement secure authorization systems. As such, the examples disclosed herein are not limited to the particular configuration of computing devices and other configurations are considered to fall within the scope of this disclosure.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The processes as disclosed herein individually depict one particular sequence of operations in a particular example. Some operations are optional and, as such, can be omitted in accord with one or more examples. Additionally, the order of operations can be altered, or other operations can be added, without departing from the scope of the apparatus and methods described herein.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

ADDITIONAL EXAMPLES

Descriptions of additional examples follow. Other variations will be apparent in light of this disclosure.

Example 1 is a method comprising detecting a message specifying a request to authorize an application to access a resource; reading an identifier from the message; determining whether the identifier is associated with a safe application or an unsafe application; and processing the message based on whether the identifier is associated with a safe application or an unsafe application.

Example 2 includes the subject matter of Example 1, wherein detecting the message comprises detecting a hypertext markup protocol message complying with OAuth 2.0.

Example 3 includes the subject matter of either Example 1 or Example 2, wherein detecting the message comprises identifying, within the message, an address of a server configured to process the request.

Example 4 includes the subject matter of Example 3, wherein identifying the address of the server comprises identifying an address of an authorization server distinct from a resource server configured to control access to the resource.

Example 5 includes the subject matter of any of Examples 1 through 4, wherein determining whether the identifier is associated with a safe application or an unsafe application comprises reading at least one parameter value from the request.

Example 6 includes the subject matter of Example 5, wherein reading the at least one parameter value comprises reading one or more of an application identifier or a redirection uniform resource identifier (URI).

Example 7 includes the subject matter of either Example 5 or Example 6, and further includes comparing the at least one parameter value to at least one value stored in one or more of a safe list or an unsafe list to generate a comparison result; and determining that the identifier is associated with a safe application by matching the at least one parameter value to at least one value stored in the safe list.

Example 8 includes the subject matter of Example 7, wherein processing the message comprises releasing the message in response to determining that the identifier is associated with the safe application.

Example 9 includes the subject matter of any of Examples 5 through 8, and further includes comparing the at least one parameter value to at least one value stored in one or more of a safe list or an unsafe list to generate a comparison result; and determining that the identifier is associated with an unsafe application by matching the at least one parameter value to at least one value stored in the unsafe list.

Example 10 includes the subject matter of Example 9, wherein processing the message comprises terminating the message in response to determining that the identifier is associated with the safe application.

Example 11 includes the subject matter of Example 10, wherein terminating the message comprises blocking further communication of the message.

Example 12 includes the subject matter of any of Examples 9 through 11, wherein processing the message comprises communicating a denial of the request to a source of the request.

Example 13 includes the subject matter of Example 12, wherein communicating the denial of the request comprises communicating the denial to a browser.

Example 14 includes the subject matter of any of Examples 1 through 13, and further includes detecting a message identifying an account associated with the resource; and determining that the account is a protected account prior to determining whether the identifier is associated with a safe application or an unsafe application.

Example 15 includes the subject matter of Example 14, wherein detecting a message identifying an account comprises detecting a message identifying a corporate account.

Example 16 is a computer system comprising a memory; and at least one processor coupled with the memory and configured to detect a message specifying a request to authorize an application to access a resource; read an identifier from the message; determine whether the identifier is associated with a safe application or an unsafe application; release the message where the identifier is associated with a safe application; and terminate the message where the identifier is associated with an unsafe application.

Example 17 includes the subject matter of Example 16, wherein the message complies with OAuth 2.0.

Example 18 includes the subject matter of either Example 16 or Example 17, wherein the identifier is a at least one parameter value from the request.

Example 19 includes the subject matter of Example 18, wherein the at least one parameter value comprises one or more of an application identifier or a redirection URI.

Example 20 is a process comprising receiving a message at an application programming interface (API) endpoint implemented by a software as a service (SaaS) environment; detecting that the message specifies a request to authorize an application to access a resource; reading an identifier from the message; determining whether the identifier is associated with a safe application or an unsafe application; processing the message based on whether the identifier is associated with a safe application or an unsafe application to generate a processing result; and responding to the message based on the processing result.

Example 21 includes the subject matter of Example 20, wherein the API endpoint is a first API endpoint; and receiving the message comprises receiving a first message addressed to a second API endpoint within a second message addressed to the first API endpoint.

Example 22 includes the subject matter of Example 21, wherein receiving the message comprises receiving a hypertext markup protocol message complying with OAuth 2.0.

The invention claimed is:

1. A method comprising:
  detecting a message specifying a request to authorize an application to access a resource;
  reading an identifier from the message;
  determining whether the identifier is associated with a safe application or an unsafe application;
  processing the message based on whether the identifier is associated with a safe application or an unsafe application;
  detecting a message identifying an account associated with the resource; and
  determining that the account is a protected account prior to determining whether the identifier is associated with a safe application or an unsafe application.

2. The method of claim 1, wherein detecting the message comprises detecting a hypertext markup protocol message complying with OAuth 2.0.

3. The method of claim 1, wherein detecting the message comprises identifying, within the message, an address of a server configured to process the request.

4. The method of claim 3, wherein identifying the address of the server comprises identifying an address of an authorization server distinct from a resource server configured to control access to the resource.

5. The method of claim 1, wherein determining whether the identifier is associated with a safe application or an unsafe application comprises reading at least one parameter value from the request.

6. The method of claim 5, wherein reading the at least one parameter value comprises reading one or more of an application identifier or a redirection uniform resource identifier (URI).

7. The method of claim 5, further comprising:
  comparing the at least one parameter value to at least one value stored in one or more of a safe list or an unsafe list to generate a comparison result; and
  determining that the identifier is associated with a safe application by matching the at least one parameter value to at least one value stored in the safe list.

8. The method of claim 7, wherein processing the message comprises releasing the message in response to determining that the identifier is associated with the safe application.

9. The method of claim 5, further comprising:
  comparing the at least one parameter value to at least one value stored in one or more of a safe list or an unsafe list to generate a comparison result; and
  determining that the identifier is associated with an unsafe application by matching the at least one parameter value to at least one value stored in the unsafe list.

10. The method of claim 9, wherein processing the message comprises terminating the message in response to determining that the identifier is associated with the safe application.

11. The method of claim 10, wherein terminating the message comprises blocking further communication of the message.

12. The method of claim 9, wherein processing the message comprises communicating a denial of the request to a source of the request.

13. The method of claim 12, wherein communicating the denial of the request comprises communicating the denial to a browser.

14. The method of claim 1 wherein determining whether the identifier is associated with a safe application or an unsafe application comprises:
  extracting an application identifier and a redirection Uniform Resource Identifier (URI) from the message;
  comparing the application identifier and the redirection URI to one or more stored values in an unsafe application list; and
  matching the application identifier and the redirection URI to one or more stored values in a safe application list.

15. The method of claim 1, wherein detecting a message identifying an account comprises detecting a message identifying a corporate account.

16. A computer system comprising:
a memory; and
  at least one processor coupled with the memory and configured to:
detect a message specifying a request to authorize an application to access a resource;
read an identifier from the message;
determine whether the identifier is associated with a safe application or an unsafe application;
release the message where the identifier is associated with a safe application; and
terminate the message where the identifier is associated with an unsafe application;
detect whether the message identifies an account associated with the resource; and
determine that the account is a protected account prior to determining whether the identifier is associated with a safe application or an unsafe application.

17. The computer system of claim 16, wherein the message complies with OAuth 2.0.

18. The computer system of claim 16, wherein the identifier is a at least one parameter value from the request.

19. The computer system of claim 18, wherein the at least one parameter value comprises one or more of an application identifier or a redirection URI.

20. A process comprising:
receiving a message at an application programming interface (API) endpoint implemented by a software as a service (Saas) environment;
detecting that the message specifies a request to authorize an application to access a resource;
reading an identifier from the message;
determining whether the identifier is associated with a safe application or an unsafe application;
processing the message based on whether the identifier is associated with a safe application or an unsafe application to generate a processing result; and
responding to the message based on the processing result;
detecting whether the message identifies an account associated with the resource; and
determine that the account is a protected account prior to determining whether the identifier is associated with a safe application or an unsafe application.

21. The process of claim 20, wherein:
the API endpoint is a first API endpoint; and
receiving the message comprises receiving a first message addressed to a second API endpoint within a second message addressed to the first API endpoint.

22. The process of claim 20, wherein receiving the message comprises receiving a hypertext markup protocol message complying with OAuth 2.0.

* * * * *